US011928382B2

(12) United States Patent
Bull et al.

(10) Patent No.: US 11,928,382 B2
(45) Date of Patent: *Mar. 12, 2024

(54) CONTEXTUAL INTELLIGENCE FOR VIRTUAL WORKSPACES PRODUCED ACROSS INFORMATION HANDLING SYSTEMS (IHSS)

(71) Applicant: Dell Products, L.P., Round Rock, TX (US)

(72) Inventors: Spencer G. Bull, Cedar Park, TX (US); Michiel Sebastiaan Emanuel Petrus Knoppert, Amsterdam (NL)

(73) Assignee: Dell Products, L.P., Round Rock, TX (US)

( * ) Notice: Subject to any disclaimer, the term of this patent is extended or adjusted under 35 U.S.C. 154(b) by 54 days.

This patent is subject to a terminal disclaimer.

(21) Appl. No.: 17/087,034

(22) Filed: Nov. 2, 2020

(65) Prior Publication Data

US 2022/0137912 A1  May 5, 2022

(51) Int. Cl.
*G06F 3/14* (2006.01)
*G06F 3/0482* (2013.01)
*G06F 3/0486* (2013.01)
*G06F 9/451* (2018.01)

(52) U.S. Cl.
CPC .......... *G06F 3/1454* (2013.01); *G06F 3/0482* (2013.01); *G06F 3/0486* (2013.01); *G06F 3/1446* (2013.01); *G06F 9/452* (2018.02); *G09G 2300/026* (2013.01); *G09G 2356/00* (2013.01)

(58) Field of Classification Search
CPC .... G06F 3/1454; G06F 3/0482; G06F 3/0486; G06F 9/452; G06F 3/1423; G06F 3/1446; G09G 2300/026; G09G 2356/00
See application file for complete search history.

(56) References Cited

U.S. PATENT DOCUMENTS

| | | | |
|---|---|---|---|
| 9,584,565 B1* | 2/2017 | Ho | H04L 65/403 |
| 10,664,772 B1* | 5/2020 | Poel | G06F 3/04842 |
| 2010/0095240 A1* | 4/2010 | Shiplacoff | G06F 3/0486 345/157 |
| 2014/0137020 A1* | 5/2014 | Sharma | G06F 3/0486 715/810 |
| 2016/0132568 A1* | 5/2016 | Vogel | G06F 3/0484 707/728 |
| 2016/0179455 A1* | 6/2016 | Liu | G06Q 30/0269 345/2.2 |
| 2018/0335939 A1* | 11/2018 | Karunamuni | G06F 3/04883 |
| 2019/0121498 A1* | 4/2019 | Jakobovits | G06F 3/0482 |
| 2019/0391779 A1* | 12/2019 | Mouyade | G09G 5/12 |

* cited by examiner

*Primary Examiner* — Roberto Borja
(74) *Attorney, Agent, or Firm* — Fogarty LLP

(57) ABSTRACT

Embodiments of systems and methods for providing contextual intelligence for virtual workspaces produced across Information Handling Systems (IHSs) are described. A first IHS may include a processor and a memory coupled to the processor, the memory having program instructions stored thereon that, upon execution, cause the first IHS to: establish a virtual workspace across a first display of the first IHS and a second display of a second IHS, at least in part, through a backend IHS, and provide a contextual menu for rendering by a given one of the first or second displays, where the given display is selected, at least in part, based upon a relative position of the first display with respect to the second display.

19 Claims, 20 Drawing Sheets

1801A — Amsterdam 🔍

Amsterdam
☀ 24,2

| 18:00 | 19:00 | 20:00 | 21:00 | 22:00 |
|---|---|---|---|---|
| ☀ | ☀ | ☀ | ☾ | ☾ |
| 24 | 22 | 20 | 18 | 15 | additional info

| Wind | 12 m/h | Humidity | 55 % |
|---|---|---|---|
| Visibility | 25 km | Visibility | 2 |

Web

1802A

- www.Iamsterdam.com
  I amsterdam - Your guide to visit, enjoy, live, work...
- en.wikipedia.org
  Amsterdam - Wikipedia
- www.amsterdam.nl
  Gemeente Amsterdam: Home
- www.amsterdam.info
  Amsterdam travel guide - amsterdam.info
- https://www.holland.com/
  Visit Amsterdam - The best thing to do - Holland.com
- Schiphol.com

| 10am | Optometrist | 📍 |
| 11am | suggested location, Park Lairessestraat | |

| 7pm | Dinner at De Kas | 📍 |
| 11pm | suggested location, Park Frankendael | |

Top Sights

- Van Gogh Museum
  World's largest Van Gogh collection
- Rijkmuseum
  Art museum housing European masterpieces
- Anne Frank House
  WWII teenage diarist's house museum
- VondelPark
  Huge park with an open-air theater

CONTEXTUAL INTELLIGENCE FOR VIRTUAL WORKSPACES PRODUCED ACROSS INFORMATION HANDLING SYSTEMS (IHSS)

FIELD

The present disclosure relates generally to Information Handling Systems (IHSs), and more particularly, to systems and methods for providing contextual intelligence for virtual workspaces produced across Information Handling Systems (IHSs).

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Embodiments of systems and methods for providing contextual intelligence for virtual workspaces produced across Information Handling Systems (IHSs) are described. In an illustrative, non-limiting embodiment, a first IHS may include a processor and a memory coupled to the processor, the memory having program instructions stored thereon that, upon execution, cause the first IHS to: establish a virtual workspace across a first display of the first IHS and a second display of a second IHS, at least in part, through a backend IHS, and provide a contextual menu for rendering by a given one of the first or second displays, where the given display is selected, at least in part, based upon a relative position of the first display with respect to the second display.

To establish the virtual workspace, the program instructions, upon execution, may further cause the first IHS to: transmit a virtual workspace initiation request to the backend IHS, where the request includes an identification of the second IHS; receive, from the backend IHS, data associated with the second IHS; determine the relative position of the second IHS with respect to the first IHS; and establish the virtual workspace across the first display of the first IHS and the second display of the second IHS based upon the data and the relative position.

The given display may be the first display in response to the first display having a selected relative position with respect to the second display. Alternatively, the given display may be the second display in response to the second display having the selected relative position with respect to the first display. In some cases, (a) the given display may be the first display during a first portion of a virtual workspace session and the given display may be the second display during a second portion of the virtual workspace session following the first portion; or (b) the given display may be the second display during a first portion of a virtual workspace session and the given display may be the first display during a second portion of the virtual workspace session following the first portion. Additionally, or alternatively, the given display may be further selected, at least in part, depending upon a proximity of the second IHS to the first IHS.

To provide the contextual menu, the program instructions, upon execution, may further cause the first IHS to present, in each of a plurality of tiles, at least one of: (i) an application or (ii) piece of content associated with one of a plurality of projects. Each of the plurality of projects may be positioned on the contextual menu based upon at least one of: a location of the first IHS, a location of the second IHS, a form-factor of the first IHS, a form-factor of the second IHS, a calendar event, a communication channel in use, a proximity of another user with respect to the user, or a proximity of the second IHS with respect to the first IHS.

Upon the user's selection of a given one of the plurality of tiles, the program instructions, upon execution, may further cause the first IHS to launch each application listed in the given tile with each associated piece of content in a last-used application window configuration. Upon the user's dragging-and-dropping of a given one of the plurality of tiles to a different location on the contextual menu, the program instructions, upon execution, may further cause the first IHS to re-position the tiles in an order selected by the user.

Upon the user's dragging-and-dropping of a piece of content from an application window to a selected tile of the contextual menu, the program instructions, upon execution, may cause the first IHS to add the piece of content to a project associated with the selected tile. Upon the user's dragging-and-dropping of a piece of content from a selected tile of the contextual menu to an application window, the program instructions, upon execution, may cause the first IHS to paste or reproduce the piece of content onto the application window. In some cases, the contextual menu may also include a search bar.

In another illustrative, non-limiting embodiment, a memory storage device may have program instructions stored thereon that, upon execution by a processor of a first IHS, cause the first IHS to: establish a virtual workspace across a first display of the first IHS and a second display of a second IHS, at least in part, through a backend IHS; and provide a contextual menu for rendering by a given one of the first or second displays, where the given display is selected, at least in part, based upon a relative position of the first display with respect to the second display.

In yet another illustrative, non-limiting embodiment, a method may include transmitting, by a first Information Handling System (IHS), a virtual workspace initiation request to a backend IHS, where the request may include an identification of a second IHS; receiving, at the first IHS from the backend IHS, data associated with the second IHS; determining, by the first IHS, a relative position of the second IHS with respect to the first IHS; establishing, by the first IHS, the virtual workspace across a first display of the first IHS and a second display of the second IHS based upon the data and the relative position; and providing, by the first IHS, a contextual menu for rendering by a given one of the first or second displays, where the given display is selected, at least in part, based upon a relative position of the first display with respect to the second display.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIGS. 14, 15A, 15B, 16, 17, and 18A-C are screenshots illustrating examples of GUI features and/or operations enabled by the method of FIG. 13, according to some embodiments.

DETAILED DESCRIPTION

Figure 1:
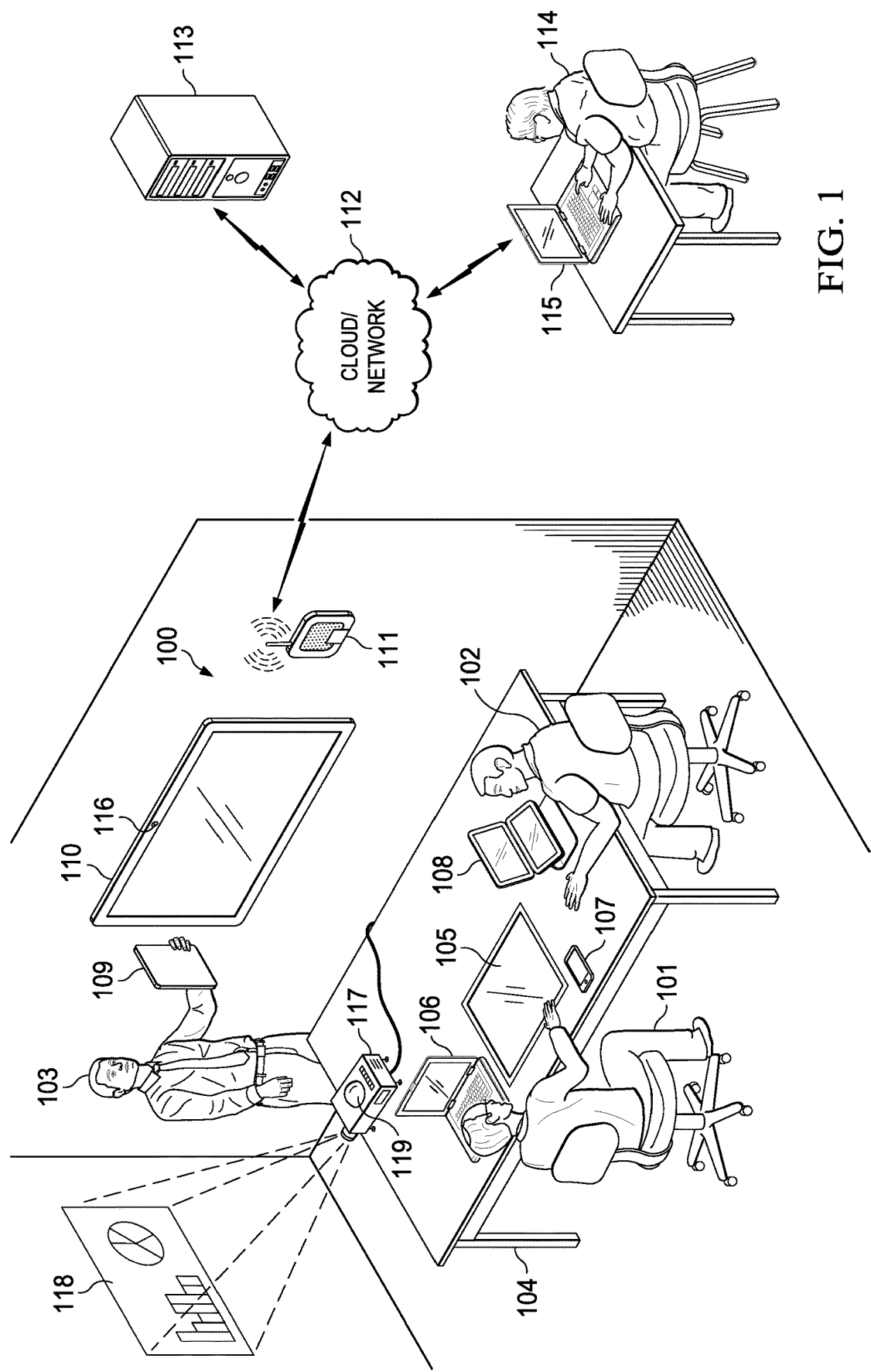
FIG. 1 is a diagram of an example of various Information Handling Systems (IHSs) configured to provide a dynamic virtual workspace with contextual control of input/output (I/O) devices, according to some embodiments.

Embodiments described herein include systems and methods for providing contextual intelligence for virtual workspaces produced across Information Handling Systems (IHSs).

As used herein, the term "virtual workspace" refers to a workspace that fuses and/or combines a set of distinct display devices of two or more IHSs into a single virtual screen space and/or that utilizes any suitable input device (e.g., a trackpad, a mouse, a stylus, a touchscreen, gaze tracking system, gesture system, etc.) of a given IHS to control and/or manipulate aspects of graphical user interface(s) rendererable across the single virtual screen. In various embodiments, the lifecycle of a virtual workspace may be dynamically orchestrated, at least in part, by a backend or cloud server configured to exchange data across the IHSs to facilitate the instantiation, configuration, and/or termination of selected aspects of the virtual workspace.

Particularly, in a cloud-connected ecosystem, a user may interact with multiple distributed IHSs while traversing through a workstream. One or more displays, keyboards, mice, or any other I/O devices may be coupled to (or may include) a respective IHS and may act as tools for enabling new forms of user interactions in the cloud-connected ecosystem.

For example, systems and methods described herein may create a virtual screen space that spans across multiple cloud-connected IHSs to further interoperability among IHSs. To enable various distributed IHSs to act or behave as a single virtual workspace, two or more displays may be orchestrated to a represent a screen space in a 2D or 3D world. Displays and other I/O devices may be added and/or removed while the user has a seamless interactive experience.

In some cases, a method may enable a set of two or more displays to act as a single virtual workspace, and it may perform orchestration operations to map selected I/O devices (e.g., mice, trackpads, styluses, touchscreens, etc.) to the virtual workspace. In some cases, such I/O devices may be authenticated during the mapping process.

First, a virtual workspace creation request may be sent from an initiating IHS, through a backend server, to other IHSs collocated in a physical space (e.g., an office, conference room, etc.). Then, a method may create and map a virtual screen space by combining (e.g., extending and/or mirroring) the displays of selected IHSs. In some cases, the method may first check whether there are existing virtual workspace space settings for the same selected IHS previously stored with the backend server. If not, a manual configuration process may allow the user to arrange and/or snap graphical representations of display spaces to a 2D coordinate plane.

Additionally, or alternatively, a visual discovery process may populate each available display space with a code (e.g., Quick Response or "QR" codes, text patterns, color patterns, visual images, etc.). An IHS, camera, and/or other sensor (i.e., gaze, infra-red (IR), ultrasound, etc.) may perform time-of-flight environmental probing (e.g., inside-out tracking, mixed/augmented reality systems, workspace projection mapping augmentation systems, etc.) to determine the relative locations of the available displays in the physical space. Then, a virtual workspace is mapped using vector coordinates of found displays and snapped to a fixed 2D or 3D space depending upon hardware capabilities, and the virtual workspace is sent to the backend server. Each IHS participating in the virtual workspace is made aware of the virtual workspace and of other displays surrounding the edges of its own display.

Upon a determination that an IHS has changed during the workflow (e.g., when an I/O device is added or remoted, where an IHS posture changes, when a wired or wireless connection is added or removed, when an IHS arrives or leaves the physical space, etc.) the process may be repeated, at least in part, for the new addition or removal. For example, if a display disposed in-between two other displays that are still in the physical space is removed, the process may dynamically snap the outer devices of the virtual workspace together to remove the missing display from the topology.

As such, systems and methods described herein may be used to curate a dynamic virtual workspace topology of devices where the state of the workspace is stored in the cloud, and each IHSs' user interface is modified to interact with other IHSs and I/O devices using a window management system across all devices in the user(s) session. These systems and methods may reduce user friction typically involved in connecting distributed IHSs, and may result in a better user experience than having to manually plug in a new IHS and have a user manually setup the virtual workspace each and every time.

Moreover, for a user to be able to control nearby or collocated IHS from another IHS (e.g., to control a projector from a laptop in a conference room, a hot/smart desk with various devices disposed on it, etc.), a mouse, keyboard, touchpad, pen, or any natural user interface (NUI) or I/O device may be securely and seamlessly linked to the virtual workspace. Upon the identification of a user's intent to initiate such a session, a trusted IHS (e.g., a device that has been authenticated) may search for nearby IHSs to connect to.

The set of I/O devices selected to be linked to the virtual workspace may be identified by the trusted IHS, which then sends a request to the other collocated IHSs through the backend server. The virtual workspace may be curated with a distributed device topology using a configurated process and/or learned behaviors. For example, the user may operate an input device of a first IHS to move a cursor or to interact with another IHSs display that has been mapped to the virtual workspace. Using a virtual workspace topology, systems and methods described herein may map various I/O device across different IHSs to create modes of interaction that feel connected to the user.

In the absence of the systems and methods described herein, a typical user would spend time configuring a conventional workspace. For instance, the typical user may spend time configuring one or more positions of one or more windows (e.g., one or more windows of one or more applications) at one or more user preferred locations on one or more displays of a conventional workspace. If the typical user switches or changes from a first context to a second context and/or changes from a first conventional workspace configuration to a second conventional workspace configuration, he or she may spend additional time configuring one or more positions of one or more windows at one or more user preferred locations on one or more displays associated with the second context and/or the second conventional workspace configuration, which may decrease their productivity.

In contrast with the aforementioned conventional workspace, however, in one or more embodiments described herein, a user may utilize one or more virtual workspace configurations that may include multiple windows (e.g., windows of one or more applications) automatically rendered across two or more displays. Moreover, these configurations may be dynamically changed. For instance, the user may utilize a first virtual workspace configuration during a first-time interval and a second virtual workspace configuration during a second time interval following the first interval, in the same session or across different sessions. In an example, a first virtual workspace configuration may include a first set of IHSs and a second virtual workspace configuration may include a second set of IHSs, different from the first set.

Workspace configuration data may include information associated with one or more executing applications (e.g., one or more applications that are "open") and associated one or more window positions. In one or more embodiments, the workspace configuration data may include information associated with and IHSs hardware (e.g., displays, touch screens, other I/O devices, peripherals, etc.) In one example, the hardware associated with the information handling system may include one or more devices associated with the information handling system and/or one or more peripheral devices, among others.

In various implementations, an arrangement of displays of a virtual workspace configuration may be determined, for example, based upon the physical locations of displays. In some embodiments, physical objects and virtual objects associated with a virtual workspace configuration may be mapped to a relative position scheme. In one example, an eye gaze tracking system may be utilized to act on objects associated with the relative position scheme.

In another example, the head tracking system may track a face of the user. The head tracking system may utilize one or more facial recognition systems, one or more facial recognition methods, and/or one or more facial recognition processes in tracking the face of the user. Additionally, or alternatively, the head tracking system may utilize one or more face detection systems, one or more facial detection methods, and/or one or more facial detection processes in tracking the face of the user. For instance, the head tracking system may utilize a Viola-Jones face detection method. In another example, the head tracking system may track a face of the user utilizing face detection. For instance, the head tracking system may classify and track positions of facial features to determine one or more head pose vectors.

In some embodiments, such a head tracking system may be or include a head pose system. One or more head pose vectors may indicate a respective one or more directions that the face of the user is facing (e.g., straight forward, up, down, left, or right). Additionally, or alternatively, the one or more head pose vectors may indicate if the face of the user is angled towards a left shoulder of the user or is angled towards a right shoulder of the user.

The eye gaze tracking system and/or a head tracking system may be utilized in determining an arrangement of displays of a virtual workspace configuration. For example, multiple vectors may be utilized as points of reference to determine a viewpoint of a user, a location of the user, and/or the orientation of the user for each of the displays of the virtual workspace configuration. Meanwhile, user input may be collected. For example, the user input may include pointer movements (e.g., mouse movements, trackball movements, touchpad movements, stylus movements, etc.) as the user utilizes the virtual workspace. In some cases, it may be assumed that the user gazed at locations associated with the user input, such that physical locations of the displays of the virtual workspace may be determined based at least on the user input and based at least on data from the eye tracking system and/or the head tracking system.

In some embodiments, systems and methods described herein may collect user input data. Collecting user input data may include, for example, collecting data associated with user input locations (e.g., cursor positions, pointer positions, etc.), pixel locations where input is placed on a display, gaze vectors, etc. Moreover, the user input data may be stored in a database.

An eye of a user may be tracked via one or more infrared (IR), near-IR sensors, and/or visible light cameras configured to capture light reflected from an eye of a user. Data associated with the eye of the user may include the presence of the eye of the user, a focus of the eye of the user, an attention of the eye of the user, a position of the eye of the user, a pupil size of the eye of the user, etc. In one or more embodiments, a gaze sensor and/or eye tracking device may include one or more IR sensors, one or more IR light emitters, one or more near IR light emitters, one or more near IR sensors, and/or one or more cameras, among others. The gaze sensor or eye tracking device may provide a pattern of light emissions to the eye of the user and it may determine where the eye of the user is looking based at least on the pattern of light and an image of a pupil of the eye of the user, for example, by comparing the pattern of light reflected from the eye of the user and the image of the pupil of the eye of the user.

Additionally, or alternatively, one or more distances from an eye tracking device and/or a head tracking device may be determined via a time-of-flight system and/or process. Additionally, or alternatively, a physical size and attributes associated with a display may be determined from data associated with the display obtained from Extended Display Identification Data (EDID) that describe capabilities of the display, which may also include a manufacturer name, a serial number, a product type, a filter type, timings supported by the display, luminance data, and pixel mapping data, among others.

The physical location of the display may be determined based upon the one or more distances from the eye tracking device and/or the head tracking device and/or based upon the physical size of the display. For example, a model (e.g., an artificial intelligence or machine learning model) may be trained to determine one or more physical locations of respective one or more displays. The physical location of a display may include a position associated with an x-axis, a y-axis, and a z-axis. The model may also be trained to determine one or more orientations (e.g., an angle of a plane of a display, a landscape or portrait orientation, etc.) of respective one or more displays. Moreover, the model may be dynamically updated based upon a change in a position of a display, etc.

In various implementations, a method may be utilized to determine the locations of displays fused into a virtual workspace. For example, the method may include displaying a graphic (e.g., QR code, text pattern, color pattern, etc.) at positions of each display and utilizing an eye tracking and/or head tracking device to determine where a user is looking, assuming that the user is looking at the graphic at the positions of each of the displays.

In some cases, determining a location of each display of a virtual workspace may include determining two vectors that are closest between two displays of the workspace configuration by calculating a normalized first vector associated with a first display and a normalized second vector associated with a second display, where a dot product (e.g., an inner product) of the normalized first vector and the normalized second vector is closest to 1.

As used here, the term "drift" generally refers to a user moving in physical space away from a configured position. For example, if drift occurs, viewpoint regions may be transformed based at least on an offset with an initial determination of physical locations of the displays.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives and one or more network ports for communicating with external devices, as well as various I/O devices, such as a keyboard, a mouse, touchscreen, and/or a display. An IHS may also include one or more buses operable to transmit communications between its various hardware components.

FIG. 1 is a diagram of an example of various IHSs 104-110, 113, and 115 configured to provide a dynamic virtual workspace with contextual control of I/O devices in physical environment 100. Although in the illustrated embodiment physical environment 100 is a conference room, in other embodiments environment 100 may be any home, office, retail establishment, airport, entertainment venue, etc.

As shown, first user 101 operates smart desk 104 (with touchscreen display 105), laptop 106, and phone 107. Meanwhile, second user 102 operates foldable device 108 (e.g., having two discrete displays coupled via a hinge) and third user 103 operates tablet 109. Users 101-103 may have access to display or smart board equipped with a gaze or head position detection device(s), time-of-flight sensor, and/or camera 116. Additionally, or alternatively, users 101-103 may have access to projector 117 (shown here on table 114, but in other cases mounted upside-down on the ceiling), capable of projecting its own screen 118 on the wall, and equipped with inside-out tracking system 119 that uses an IR depth field or emitter configured to scan the dimensions of room 100 and to determine when a given IHS enters or leaves room 100 using object tracking.

In this case, devices 105-110 are coupled to cloud/network 112 (e.g., the Internet) via wireless router or access point 111. Backend server 113 and remote user 114 operating laptop 115 are also coupled to cloud/network 112.

Any number of devices 104-110 and 113 may be selected to participate in a virtual workspace session, as described in more detail below, by fusing two or more displays from different IHSs into a single virtual workspace and/or by allowing one or more I/O devices coupled or integrated into a given IHS to perform seamless operations across the virtual workspace.

Each of devices 105-110, 113, and/or 115 may be a different instance of IHS 200, described in more detail below, with different components and/or form-factors. It should be noted that the various elements described with respect to FIG. 1 are provided for sake of illustration only. Other use-cases may include other types of IHS(s), more or fewer IHS user(s), and any number of location(s).

Figure 2:
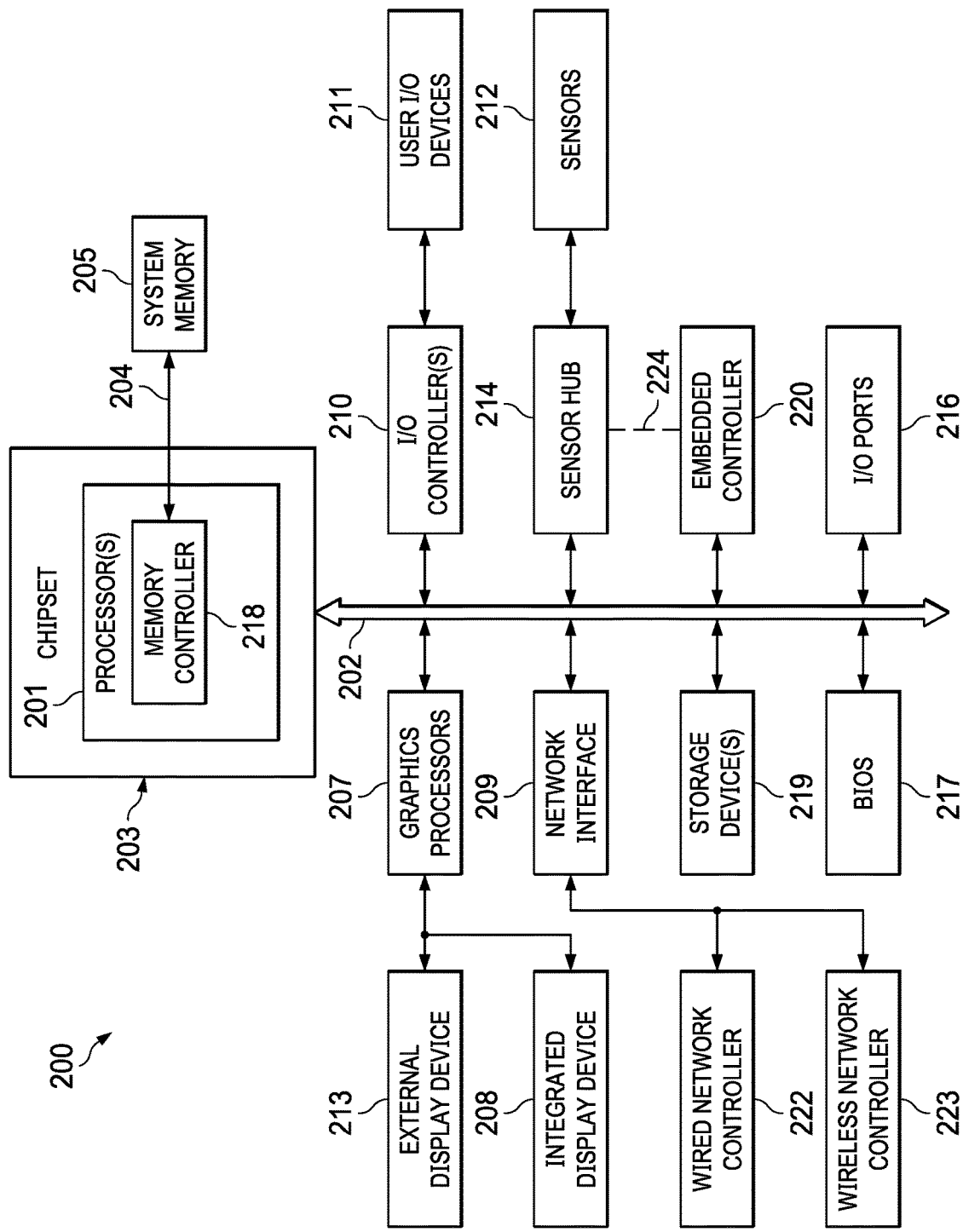
FIG. 2 is a block diagram of an example of hardware components configured to provide a dynamic virtual workspace with contextual control of I/O devices, according to some embodiments.

FIG. 2 is a block diagram of an example of hardware components of IHS 200 configured to provide a dynamic virtual workspace with contextual control of I/O devices. As shown, IHS 200 includes one or more processors 201, such as a Central Processing Unit (CPU), that execute code retrieved from system memory 205. Although IHS 200 is illustrated with a single processor 201, other embodiments may include two or more processors, that may each be configured identically, or to provide specialized processing operations. Processor 201 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 2, processor 201 includes integrated memory controller 218 that may be implemented directly within the circuitry of processor 201, or memory controller 218 may be a separate integrated circuit that is located on the same die as processor 201. Memory controller 218 may be configured to manage the transfer of data to and from system memory 205 of IHS 200 via high-speed memory interface 204. System memory 205 that is coupled to processor 201 provides processor 201 with a high-speed memory that may be used in the execution of computer program instructions by processor 201.

Accordingly, system memory 205 may include memory components, such as static RAM (SRAM), dynamic RAM (DRAM), NAND Flash memory, suitable for supporting high-speed memory operations by the processor 201. In certain embodiments, system memory 205 may combine both persistent, non-volatile memory and volatile memory. In certain embodiments, system memory 205 may include multiple removable memory modules.

IHS 200 utilizes chipset 203 that may include one or more integrated circuits that are connect to processor 201. In the embodiment of FIG. 2, processor 201 is depicted as a component of chipset 203. In other embodiments, all of chipset 203, or portions of chipset 203 may be implemented directly within the integrated circuitry of processor 201. Chipset 203 provides processor 201 with access to a variety of resources accessible via bus 202. In IHS 200, bus 202 is illustrated as a single element. Various embodiments may utilize any number of separate buses to provide the illustrated pathways served by bus 202.

In various embodiments, IHS 200 may include one or more I/O ports 216 that may support removeable couplings with various types of external devices and systems, including removeable couplings with peripheral devices that may be configured for operation by a particular user of IHS 200. For instance, I/O ports 216 may include USB (Universal Serial Bus) ports, by which a variety of external devices may be coupled to IHS 200. In addition to or instead of USB ports, I/O ports 216 may include various types of physical I/O ports that are accessible to a user via the enclosure of the IHS 200.

In certain embodiments, chipset 203 may additionally utilize one or more I/O controllers 210 that may each support the operation of hardware components such as user I/O devices 211 that may include peripheral components that are physically coupled to I/O port 216 and/or peripheral components that are wirelessly coupled to IHS 200 via network interface 209. In various implementations, I/O controller 210 may support the operation of one or more user I/O devices 210 such as a keyboard, mouse, touchpad, touchscreen, microphone, speakers, camera and other input and output devices that may be coupled to IHS 200. User I/O devices 211 may interface with I/O controller 210 through wired or wireless couplings supported by IHS 200. In some cases, I/O controllers 210 may support configurable operation of supported peripheral devices, such as user I/O devices 211.

As illustrated, a variety of additional resources may be coupled to processor 201 through chipset 203. For instance, chipset 203 may be coupled to network interface 209 that may support different types of network connectivity. IHS 200 may also include one or more Network Interface Controllers (NICs) 222 and 223, each of which may implement hardware required for communicating via a specific networking technology, such as Wi-Fi, BLUETOOTH, Ethernet and mobile cellular networks (e.g., CDMA, TDMA, LTE). Network interface 209 may support network connections by wired network controllers 222 and wireless network controllers 223. Each network controller 222 and 223 may be coupled via various buses to chipset 203 to support different types of network connectivity, such as the network connectivity utilized by IHS 200.

Chipset 203 may also provide access to one or more integrated display device(s) 208 and/or external display devices(s) 213 via graphics processor 207. Graphics processor 207 may be included within a video card, graphics card or within an embedded controller installed within IHS 200. Additionally, or alternatively, graphics processor 207 may be integrated within processor 201, such as a component of a system-on-chip (SoC). Graphics processor 207 may generate display information and provide the generated information to one or more display devices 208 and/or 213, coupled to IHS 200.

One or more display devices 208 and/or 213 coupled to IHS 200 may utilize LCD, LED, OLED, or other display technologies. Each display device 208 and 213 may be capable of receiving touch inputs such as via a touch controller that may be an embedded component of the display device 208 and/or 213 or graphics processor 207, or it may be a separate component of IHS 200 accessed via bus 202. In some cases, power to graphics processor 207, integrated display device 208 and/or external display 213 may be turned off or configured to operate at minimal power levels in response to IHS 200 entering a low-power state (e.g., standby).

As illustrated, IHS 200 may support integrated display device 208, such as a display integrated into a laptop, tablet, 2-in-1 convertible device, or mobile device. IHS 200 may also support use of one or more external displays 213, such as external monitors that may be coupled to IHS 200 via various types of couplings, such as by connecting a cable from the external display 213 (e.g., an external monitor, a projector, a smart table, etc.) to external I/O port 216 of IHS 200. In certain scenarios, the operation of integrated display(s) 208 and external display(s) 213 may be configured for a particular user. For instance, a particular user may prefer specific brightness settings that may vary the display brightness based on time of day and ambient lighting conditions.

Chipset 203 also provides processor 201 with access to one or more storage device(s) 219. In various embodiments, storage device 219 may be integral to IHS 200 or may be external to IHS 200. Storage device 219 may be accessed via a storage controller that may be an integrated component of the storage device. Also, storage device 219 may be implemented using any memory technology allowing IHS 200 to store and retrieve data. For instance, storage device 219 may be a magnetic hard disk storage drive or a solid-state storage drive. In certain embodiments, storage device 219 may be a system of storage devices, such as a cloud system or enterprise data management system that is accessible via network interface 209.

As illustrated, IHS 200 also includes Basic Input/Output System (BIOS) 217 that may be stored in a non-volatile memory accessible by chipset 203 via bus 202. Upon powering or restarting IHS 200, processor(s) 201 may utilize BIOS 217 instructions to initialize and test hardware components coupled to the IHS 200. BIOS 217 instructions may also load an operating system (OS) (e.g., WINDOWS, MACOS, iOS, ANDROID, LINUX, etc.) for use by IHS 200.

BIOS 217 provides an abstraction layer that allows the operating system to interface with the hardware components of the IHS 200. The Unified Extensible Firmware Interface (UEFI) is a successor to BIOS. As a result, certain IHSs may utilize UEFI in addition to or instead of a BIOS. As used herein, BIOS is intended to also encompass UEFI.

As illustrated, certain IHS 200 embodiments may utilize sensor hub 214 capable of sampling and/or collecting data from a variety of hardware sensors 212. For instance, sensors 212, may be disposed within IHS 200, and/or display 208, and/or a hinge coupling a display portion to a keyboard portion of IHS 200 (or coupling two displays together, in the case IHS 200 has a foldable form factor) and may include, but are not limited to: electric, magnetic, hall effect, radio, optical, infrared, gaze, thermal, force, pressure, touch, acoustic, ultrasonic, proximity, position, location, angle, deformation, bending, direction, movement, velocity, rotation, acceleration, bag state (in or out of a bag), and/or lid sensor(s) (open or closed).

In some cases, one or more sensors 212 may be part of a keyboard or other input device. Processor 201 may be configured to process information received from sensors 212 through sensor hub 214, and to perform methods for resolving remote meeting conflicts using learned attributes and contextual information obtained from sensors 212.

For instance, during operation of IHS 200, the user may open, close, flip, swivel, or rotate display 208 to produce different IHS postures. In some cases, processor 201 may be configured to determine a current posture of IHS 200 using sensors 212. For example, in a dual-display IHS implementation, when a first display 208 (in a first IHS portion) is folded against a second display 208 (in a second IHS portion) so that the two displays have their backs against each other, IHS 200 may be said to have assumed a book posture. Other postures may include a table posture, a display posture, a laptop posture, a stand posture, or a tent posture, depending upon whether IHS 200 is stationary, moving, horizontal, resting at a different angle, and/or its orientation (landscape vs. portrait).

For example, in a laptop posture, first display 208 may be facing the user at an obtuse angle with respect to a second display surface of a second display 208 or a physical keyboard portion. In a tablet posture, a first display 208 may be at a straight angle with respect to a second display 208 or a physical keyboard portion. And, in a book posture, a first display 208 may have its back resting against the back of a second display 208 or a physical keyboard portion.

It should be noted that the aforementioned postures, and their various respective keyboard states, are described for sake of illustration. In different embodiments, other postures may be used, for example, depending upon the type of hinge coupling the displays, the number of displays used, or other accessories.

In other cases, processor 201 may receive user presence data collected by sensors 212 and may determine, for example, whether an IHS's end-user is present or absent. Moreover, in situations where the end-user is present before IHS 200, processor 201 may further determine a distance of the end-user from IHS 200 continuously or at pre-determined time intervals. The detected or calculated distances may be used by processor 201 to classify the user as being in the IHS's near-field (user's position<threshold distance A), mid-field (threshold distance A<user's position<threshold distance B, where B>A), or far-field (user's position>threshold distance C, where C>B) with respect to IHS 200 and/or display 208.

More generally, in various implementations, processor 201 may receive and/or to produce system context information using sensors 212 including one or more of, for example: a user's presence state (e.g., present, near-field, mid-field, far-field, absent), a facial expression of the user, a direction of the user's gaze, a user's gesture, a user's voice, an IHS location (e.g., based on the location of a wireless access point or Global Positioning System), IHS movement (e.g., from an accelerometer or gyroscopic sensor), whether the IHS is sitting on a table or horizontal surface, whether the IHS is facing up or down, lid state (e.g., of a laptop), hinge angle (e.g., in degrees), IHS posture (e.g., laptop, tablet, book, tent, and display), whether the IHS is coupled to a dock or docking station, a distance between the user and at least one of: the IHS, the keyboard, or a display coupled to the IHS, a type of keyboard (e.g., a physical keyboard integrated into IHS 200, a physical keyboard external to IHS 200, or an on-screen keyboard), whether the user operating the keyboard is typing with one or two hands (e.g., holding a stylus, or the like), a time of day, software application(s) under execution in focus for receiving keyboard input, whether IHS 200 is inside or outside of a carrying bag, ambient lighting, a battery charge level, whether IHS 200 is operating from battery power or is plugged into an AC power source (e.g., whether the IHS is operating in AC-only mode, DC-only mode, or AC+DC mode), a power consumption of various components of IHS 200 (e.g., CPU 201, GPU 207, system memory 205, etc.).

In certain embodiments, sensor hub 214 may be an independent microcontroller or other logic unit that is coupled to the motherboard of IHS 200. Sensor hub 214 may be a component of an integrated system-on-chip incorporated into processor 201, and it may communicate with chipset 203 via a bus connection such as an Inter-Integrated Circuit ($I^2C$) bus or other suitable type of bus connection. Sensor hub 214 may also utilize an $I^2C$ bus for communicating with various sensors supported by IHS 200.

As illustrated, IHS 200 may utilize embedded controller (EC) 220, which may be a motherboard component of IHS 200 and may include one or more logic units. In certain embodiments, EC 220 may operate from a separate power plane from the main processors 201 and thus the OS operations of IHS 200. Firmware instructions utilized by EC 220 may be used to operate a secure execution system that may include operations for providing various core operations of IHS 200, such as power management, management of operating modes in which IHS 200 may be physically configured and support for certain integrated I/O functions. In some embodiments, EC 220 and sensor hub 214 may communicate via out-of-band signaling pathway or bus 224.

In various embodiments, IHS 200 may not include each of the components shown in FIG. 2. Additionally, or alternatively, IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 201 as an SoC.

Figure 3:
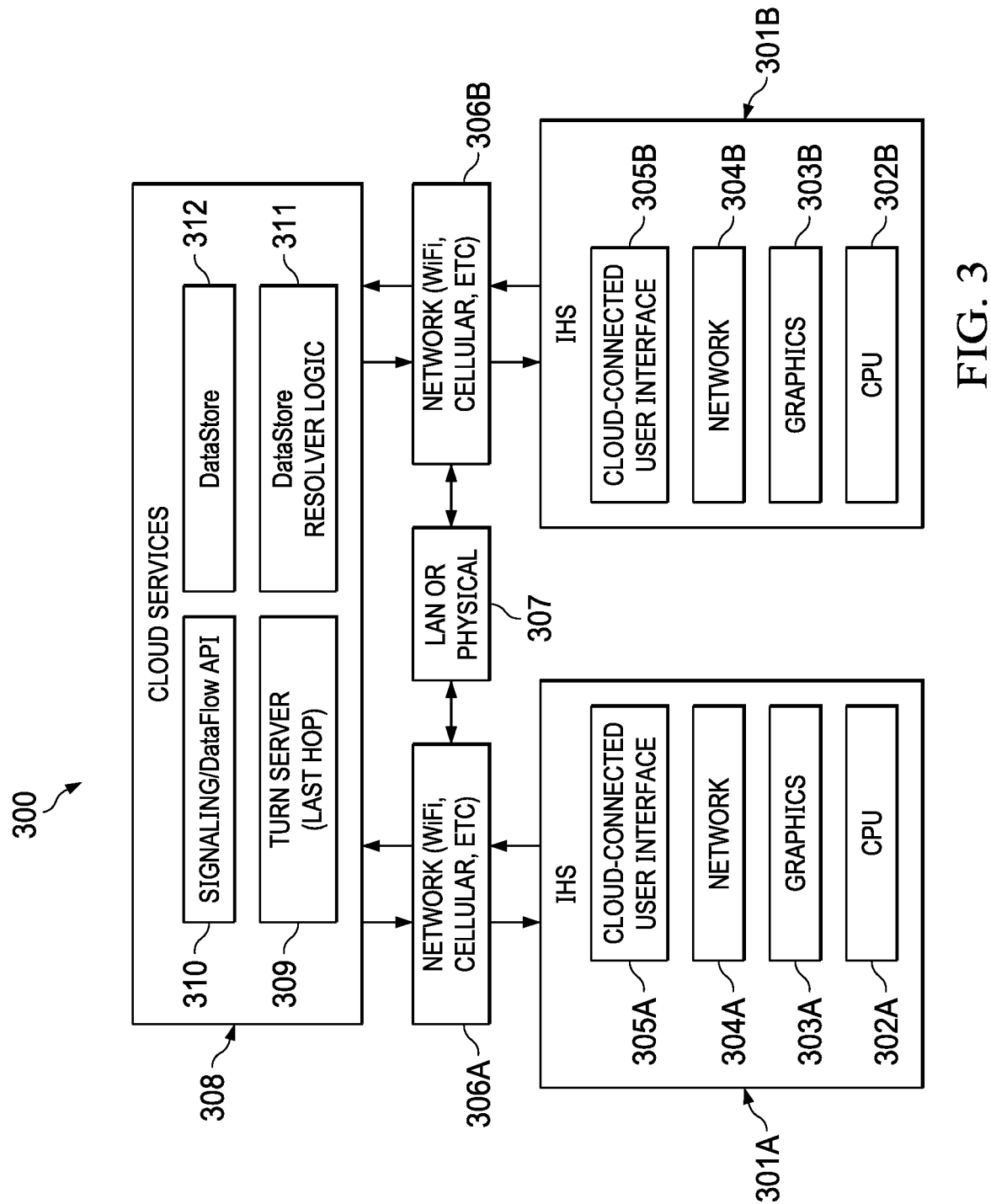
FIG. 3 is a block diagram of an example of software components configured to provide a dynamic virtual workspace with contextual control of I/O devices, according to some embodiments.

FIG. 3 is a block diagram of an example of software components 300 configured to provide a dynamic virtual workspace with contextual control of I/O devices. In some embodiments, one or more of components 300 may be instantiated, at least in part, in response to the execution by one or more processor(s) of program instructions stored in one or more hardware memor(ies). Moreover, IHSs 301A and 301B may each represent any of IHSs 104-110, 113, and 115. Although only two IHSs 301A and 301B are used in this case, As illustrated, IHS 301A includes cloud-connected user interface 305A supported by Central Processing Unit (CPU) 302A (e.g., processor 201), graphics processor 303A (e.g., processor 207), network adaptor 304A (e.g., controller 223)—whereas IHS 302B includes its own respective components 302B-305B. Each of IHSs 301A and 301B is coupled to cloud services 308 (e.g., instantiated via backend server 113) via a respective network access system or device 306A and 306B (e.g., access point 111). IHSs 301A and 301B are also coupled to each other via local area or physical network 307, which may be supported by access point 111, WiFi connection(s), Bluetooth direct connection(s), mesh networks, peer-to-peer (P2P) connections, etc.

Cloud services 308 include turn server 309 configured to enable P2P connections between two or more IHSs 301A and 301B that are in different networks. Signaling/dataflow component 310 includes an Application Programming Interface (API) configured to enable virtual workspace connection and initialization operations. Particularly, such an API may be configured to receive, process, and execute GET and POST commands with respect to connection data for P2P connections, as well as with respect to metadata and telemetry about IHSs 301A and 301B and/or I/O devices.

DataStore resolver block 311 includes a control plane usable to access datastore 312. Datastore 312 may be configured to store metadata usable to initiate, maintain, modify, and terminate a virtual workspace across the displays and/or other I/O devices of IHS 301A and IHS 301B. Examples of such metadata include, but are not limited to: IHS or display topology, open applications, open documents, context information (e.g., user identify, user proximity, IHS posture, hinge angle, geographical location, etc.), nearby IHSs and users, hardware settings (e.g., volume, brightness, etc.), pointer information, audio streams, window states, gesture data, eye-tracking data, head tracking data, real-time telemetry sensor readings, IHS and device capabilities, display resolution, DPI, connected devices, system type, application telemetry, machine learning or artificial intelligence model(s), etc.

In operation, each of cloud-connected interfaces 305A and 305B may communicate with each other via cloud services 308 to subscribe to live data updates over sockets, post updates, and/or query data from datastore 312.

Figure 4:
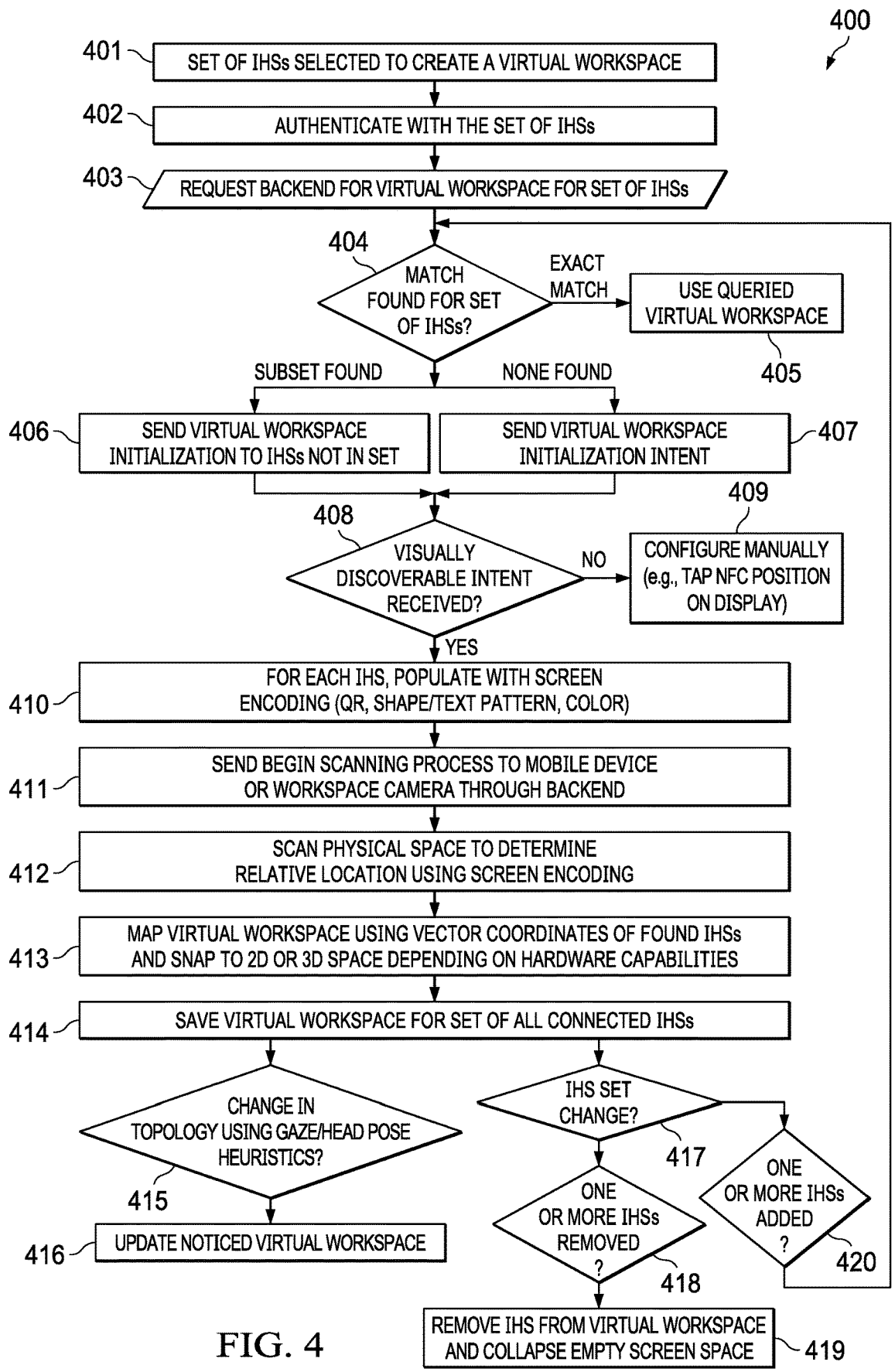
FIG. 4 is a flowchart illustrating an example of a method for dynamically assembling a virtual workspace, according to some embodiments.

FIG. 4 is a flowchart illustrating an example of method 400 for dynamically assembling a virtual workspace. In various embodiments, method 400 may be performed through the operation of one or more software components 300 by one or more hardware components 200. Particularly, at block 401, method 400 includes selecting a set of IHSs to create a virtual workspace. At block 403, method 400 includes authenticating the set of IHSs (e.g., collocated IHSs) using any suitable security or identity verification mechanism. Then, at block 403, method 400 includes requesting a backend server for virtual workspace screen space corresponding to the selected set of IHSs.

At block 404, method 400 determines whether a configuration match is found in a database for the selected IHSs. If an exact match is found, block 405 uses the queried screen space and stored configuration settings with the set of IHSs to create a virtual workspace. If a subset of the selected IHSs is found in stored configuration settings, block 406 sends a virtual screen space initialization command(s) to those of the selected set of IHSs that are not in the stored set. Or, if none of the selected IHSs is found in stored configuration settings, block 407 sends the virtual screen space initialization command(s) to all of the selected IHSs.

At block 408, method 408 determines if a visually discoverable intent is received-particularly in cases where one of the selected IHSs is a mobile device (e.g., a smart phone, tablet, etc.). For example, the user may select an automatic configuration option using inside-out tracking, camera image(s), gaze detection, and/or head pose detection. If no such intent is received, block 409 configures the virtual workspace manually by using legacy topology flows (e.g., tapping a Near-Field-Communication (NFC) position on each display, etc.). Otherwise, at block 410, method 400 populates each IHS display with a code (e.g., QR, text, color, etc.).

At block 411, method 400 sends a begin scanning process to the mobile device or workspace camera through the backend server. At block 412, method 400 scans the physical space to determine the relative location of each display, identifying each display using the screen encoding of block 410. In some cases, the relative location of display A with respect to display B is selected from: display A is to the left of display B, display A is to the right of display B, display A is above display B, or display A is below display B.

At block 413, method 400 maps the virtual screen space using vector coordinates of found IHSs and snaps each virtual screen to a 2D or 3D space (depending upon hardware capabilities). At block 414, method 400 saves the virtual workspace configuration information for the set of IHSs selected in block 401.

At block 415, method 400 determines if there has been a change in topology using gaze/head pose sensors. If so, block 416 updates the noticed virtual workspace. Meanwhile, block 417 determines if there has been a change to the selected set of IHSs. If block 420 determines that one of more IHSs have been added, control returns to block 404. Conversely, if block 418 determines that one or more IHSs have been removed from the physical space, block 419 removes the corresponding display from the virtual workspace and collapses the empty space.

Figure 5:
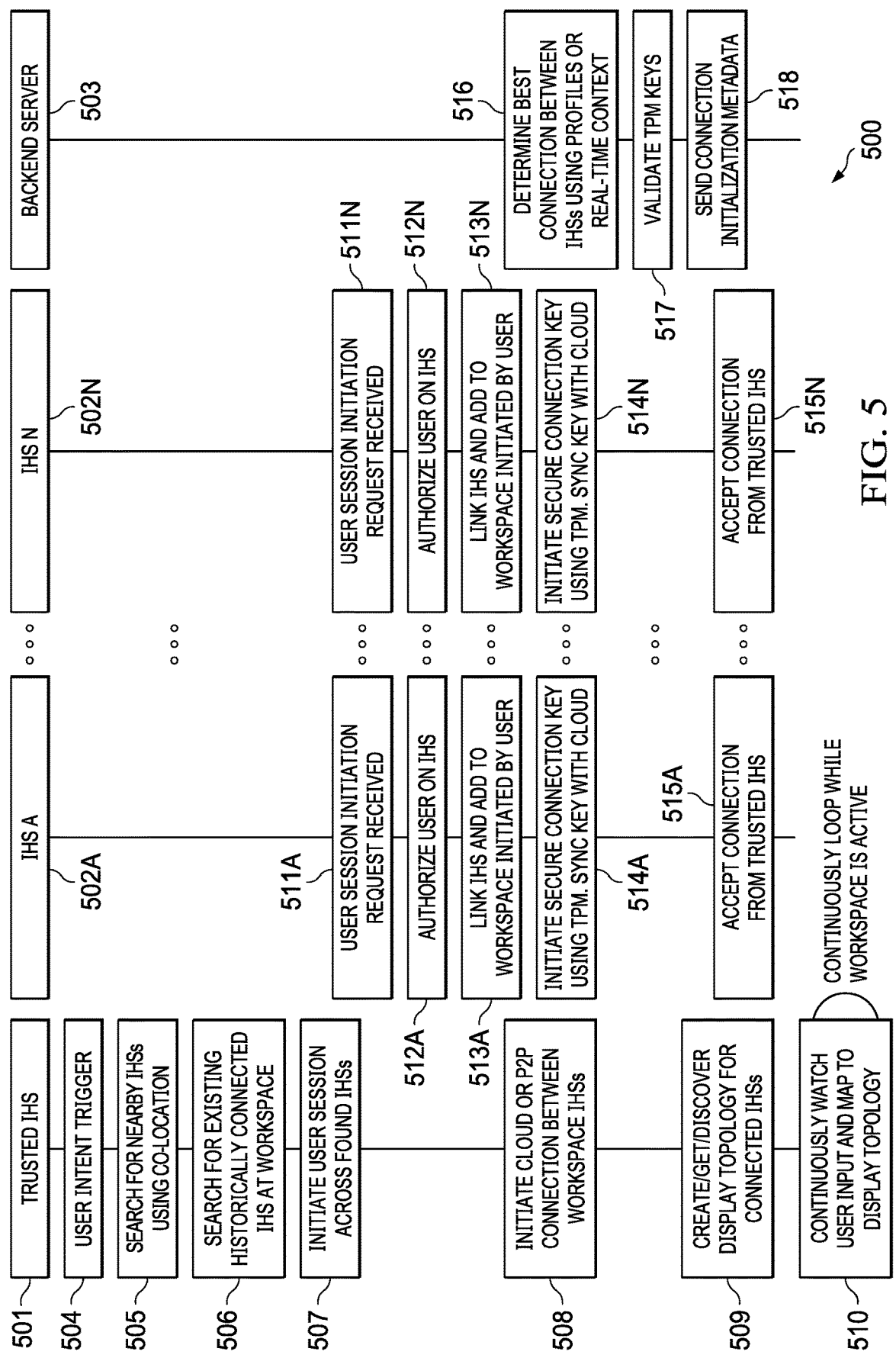
FIG. 5 is a flowchart illustrating an example of a method for contextually controlling multiple I/O devices in a virtual workspace, according to some embodiments.

FIG. 5 is a flowchart illustrating an example of method 500 for contextually controlling multiple I/O devices (e.g., keyboard, mice, trackpad, touchscreen, stylus, etc.) in a virtual workspace. In various embodiments, method 500 may be performed through the operation of one or more software components 300 by one or more hardware components 200.

At block 504, trusted device (e.g., a user's mobile phone) receives or identifies a user intent trigger (e.g., the phone is placed horizontally on a desk, as detected using gyroscope sensor; the phone enterers a particular room or geographic location; the user issues a command, etc.) to initiate a virtual workspace session. At block 505, trusted device 501 searches for nearly or collocated IHSs. At block 506, trusted device 501 searches for existing historically connected IHSs as stored workspaces. Then, at block 507, trusted device 501 initiates a user session across found IHSs.

Specifically, at blocks 511A-N, each of IHSs 502A-N receives a user's request for a virtual workspace session initiation. At blocks 512A-N, each of each of IHSs 502A-N authenticates the user as being authorized to initiate the virtual workspace session. At blocks 513A-N, each of each of IHSs 502A-N links that IHS and adds its display to the virtual workspace.

At block 516, backend server 503 determines the best connection (e.g., wired, P2P, cloud loop, etc.) between IHSs 502A-N using profiles and/or real-time context information, and at block 508 trusted IHS 501 initiates a cloud or P2P connection between IHSs 502A-N. At blocks 514A-N, each of each of IHSs 502A-N initiates a secure connection key using a Trusted Platform Module or the like, syncing the key with backend server 503. Particularly, at block 517, backend server 503 validates the TMP keys, and at block 518 backend server sends connection initialization metadata to IHSs 502A-N.

At block 509, trusted IHS 501 creates, gets, or discovers the display topology for the connected IHSs, while at blocks 515A-N IHSs 502A-N accept connection(s) from trusted IHS 501. Then, at block 510, trusted IHS 501 continuously monitors user input and maps to the virtual workspace according to the display topology. Block 510 may be continuously looped while the virtual workspace is active.

Figure 6:
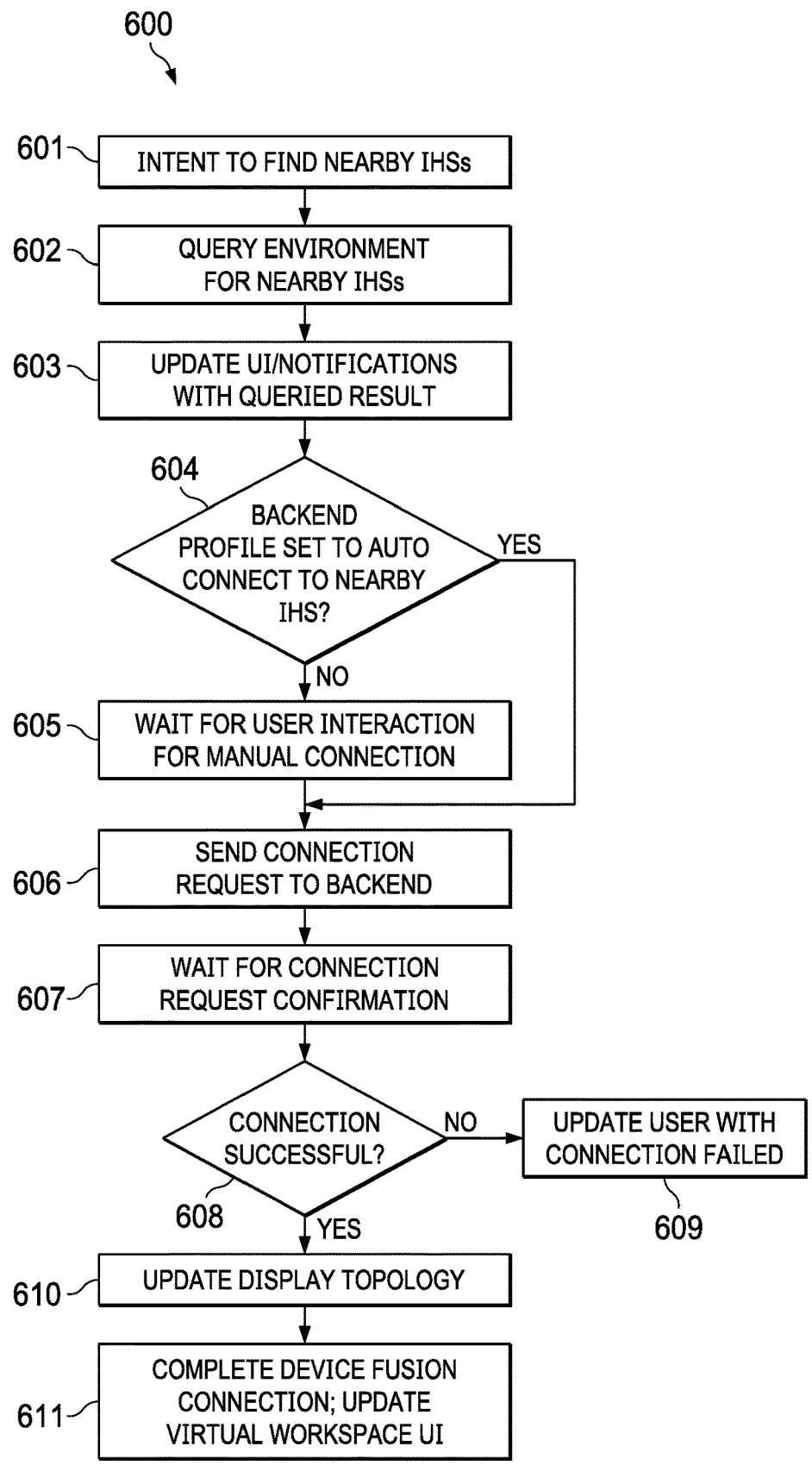
FIG. 6 is a flowchart illustrating an example of a method for initiating an I/O device fusion service, according to some embodiments.
Figure 7:
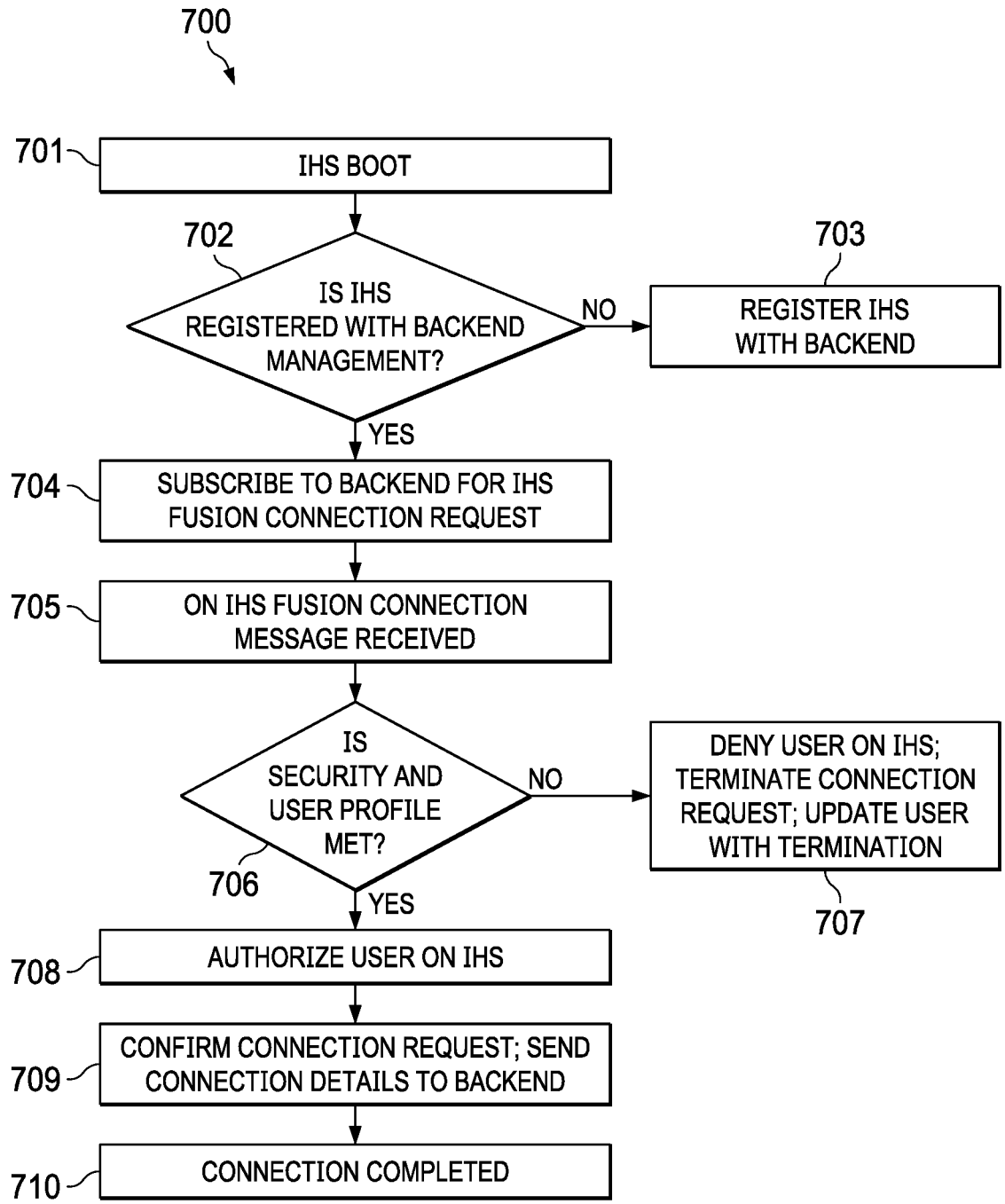
FIG. 7 is a flowchart illustrating an example of a method for processing an I/O device fusion service connection request, according to some embodiments.

FIG. 6 is a flowchart illustrating an example of method 600 for initiating an I/O device fusion service and FIG. 7 is a flowchart illustrating an example of method 700 for processing an I/O device fusion service connection request. In various embodiments, methods 600 and 700 may be performed through the operation of one or more software components 300 by one or more hardware components 200. Particularly, method 600 may be performed by an IHS in a client role, method 700 may be performed by another IHS in a server role, and a backend server may serve as a communications broker, relaying virtual workspace configuration data between the IHSs.

In FIG. 6, at block 601, method 600 receives an intent or command from a user to find nearby IHSs to participate in a virtual workspace session. At block 602, method 600 queries the physical environment for nearby IHSs. At block 603, method 600 updates the IHSs user interface (UI) to provide the user with notifications of query results. At block 604, method 600 determines if the backend server profile is set to auto-connect to nearby IHSs. If not, block 605 waits for the user interaction to start a manual connection. Otherwise control passes to block 606, where method 600 sends a connection request to the backend server.

At block 607, method 600 waits for a connection request confirmation from the backend server. Block 608 determines, based upon the confirmation, whether the connection attempt has been successful. If not, block 609 updates the user with a connection failure message. If so, block 610 updates the virtual workspace with the display of the nearby IHS, and block 611 completes the IHS fusion connection and updates the UI.

In FIG. 7, at block 701, method 700 boots the IHS. At block 702, method 700 determines if the IHS is registered with the backend server. If not, block 703 registered the IHS with the backend server. If so, block 704 subscribes to the backend server for IHS fusion connection requests which then initiate or create a virtual workspace. At block 705, method 700 receives a fusion connection or workspace initiation request.

At block 706, method 700 determines if security parameters and user profile are met. If not, block 707 denies the request, terminates the connection, and notifies the user of the termination. Otherwise block 708 authorizes the virtual workspace for the user, block 709 confirms the connection request and sends connection information to the backend server, and at block 710 method 700 determines the connection has been completed and the virtual workspace created.

In various embodiments, systems and methods described herein may provide a graphical user interface (GUI) for controlling virtual workspaces produced across IHSs. For example, a virtual workspace interface may offer an overview of available friends/colleagues and nearby IHSs and/or I/O devices so that user can share content and move tasks (e.g., application windows) between IHSs in the virtual workspace without further need for connection configuration (the virtual workspace may be orchestrated automatically by a backend server). Additionally, from the same virtual workspace interface, the user may discover other nearby devices to use (e.g., in a meeting room) and may manage device fusion operations across those devices (virtual workspace assembly).

In an example, a virtual workspace interface may enable a user to move application windows and content between IHSs. Users can simply drag and drop any application window onto a new destination to move the task over. This feature may be useful, for instance, when a user wants to continue watching a video on another IHS with a bigger screen, or when the user is organizing tasks across available IHSs.

In another example, a virtual workspace interface may enable a user to project application windows and/or content to shared IHSs. When a user shares an application window to a shared/public IHS, the content may be projected while the user keeps control of the content on their personal IHS. That is, in projection mode, the user may share a "projection" of the application window while the active application window stays on that user's IHS and can be navigated/controlled locally. The user may drag content to a nearby IHS, and the backend server may create a cloud handshake between the two IHSs to enable the application window to be mirrored on the nearby IHS.

In yet another example, a virtual workspace interface may leverage collaboration feature(s) to invite people to collaborate on an activity. Cloud-based applications let multiple people work on content simultaneously and have permissions management built-in. In a virtual workspace interface, sharing an application window with another person triggers these features. It sends that person an invite to collaborate on the content and allows the user to set permissions. In the virtual workspace interface and/or application, a user can see if somebody else has joined.

In still another example, a virtual workspace interface may be used to fuse IHSs/devices and create a shared workspace/desktop. In addition to sharing content, the virtual workspace interface may enable the user to fuse devices in a drag-and-drop manner. By drag-dropping two IHSs on top of each other, these IHS become connected and the cloud session spans across the two IHSs. Once the IHSs are connected, an IHS button and/or icon may be displayed on the virtual workspace interface to indicate their linkage. Moreover, when there is additional work to properly setup the workspace, the user may be prompted with an overview (also available by clicking the button) from where the workspace can be setup and/or managed, including the display topology, audio output, and/or peripheral or I/O devices.

Figure 8:
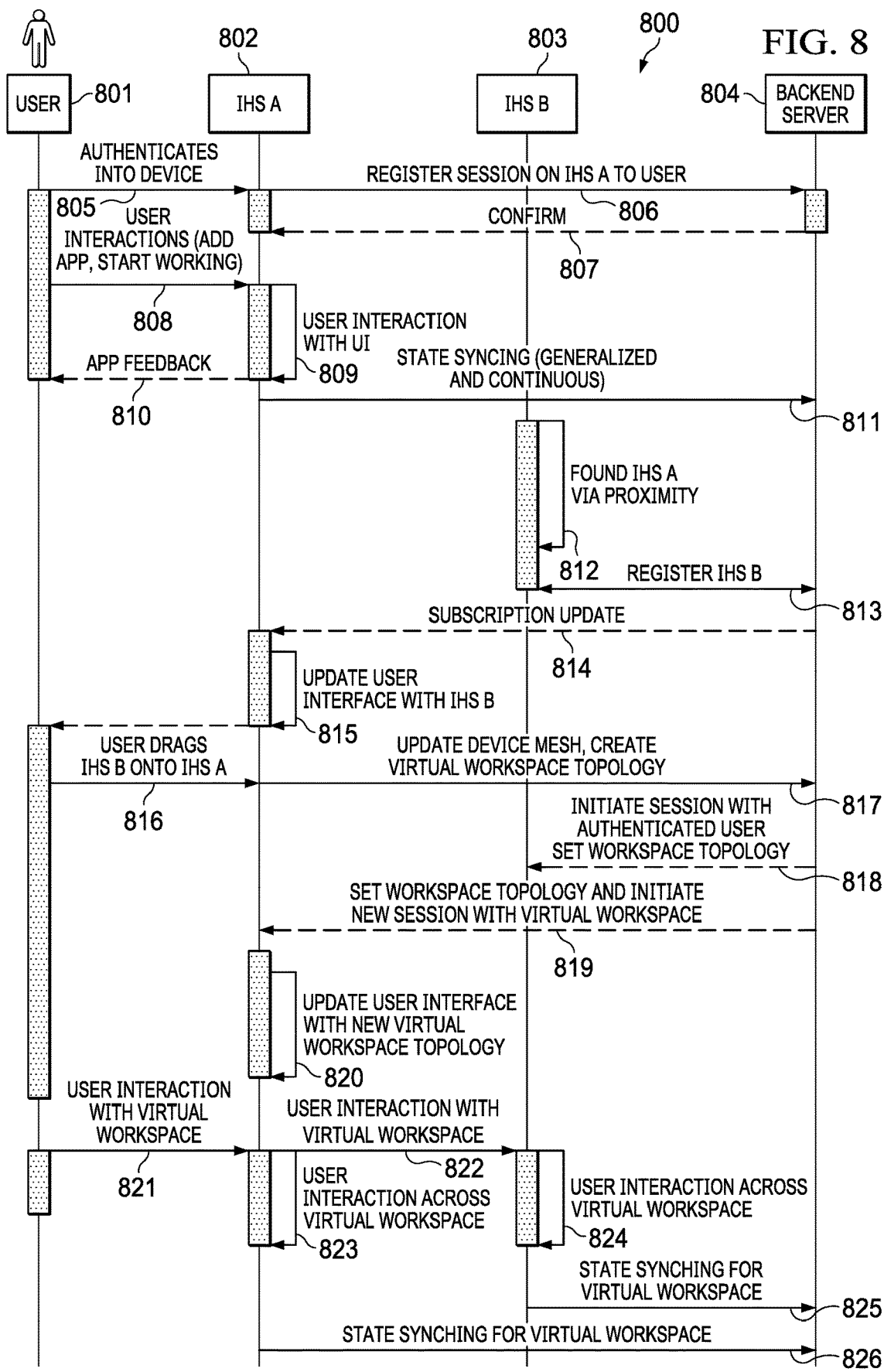
FIG. 8 is a diagram illustrating an example of a method for providing a graphical user interface (GUI) for controlling virtual workspaces produced across IHSs, according to some embodiments.

FIG. 8 is a diagram illustrating an example of method 800 for providing a virtual workspace interface, and FIGS. 9-11, 12A, and 12B are screenshots illustrating examples of GUI operations enabled by method 800. In various embodiments, method 800 may be performed through the execution of one or more software components 300 by one or more hardware components 200.

At step 805, user 801 authenticates into IHS A 802 (e.g., username and password, biometric authentication, etc.). In response to the user's successful authentication, step 806 registers a virtual workspace session by user 801 on IHS A

802 with backend server 804. Confirmation message 807 is sent by backend server 804 to IHS A 802.

At this point, only IHS A 802 is participating in the newly created (or resumed) virtual workspace session. As user 801 performs any number of interactions with IHS A 802 (e.g., start an application, open content, change IHS posture, etc.), IHS A 802 enables those interactions via a GUI at step 809. Application feedback 810 is provided in response to those interactions. Moreover, at step 811, IHS A 802 transmits data and/or metadata indicative of such interactions to backend server 804 to perform state synchronization.

At step 812, IHS B 803 (e.g., another IHS collocated with respect to IHS A 802) finds IHS A 802 (e.g., using proximity detection, inside-out tracking, etc.), for instance, in cases where IHS A 802 and/or IHS B 803 has been preregistered with backend server 804. At step 813, IHS B 803 is registered with backend server 804 for the user's current virtual workspace session, and at step 814 backend sever 804 notifies IHS A 802 that IHS B 803 has joined the virtual workspace by way of a subscription update message. Then, at step 815, IHS A 802 updates a GUI of the virtual workspace to include a graphical representation of IHS B 803.

Figure 9:
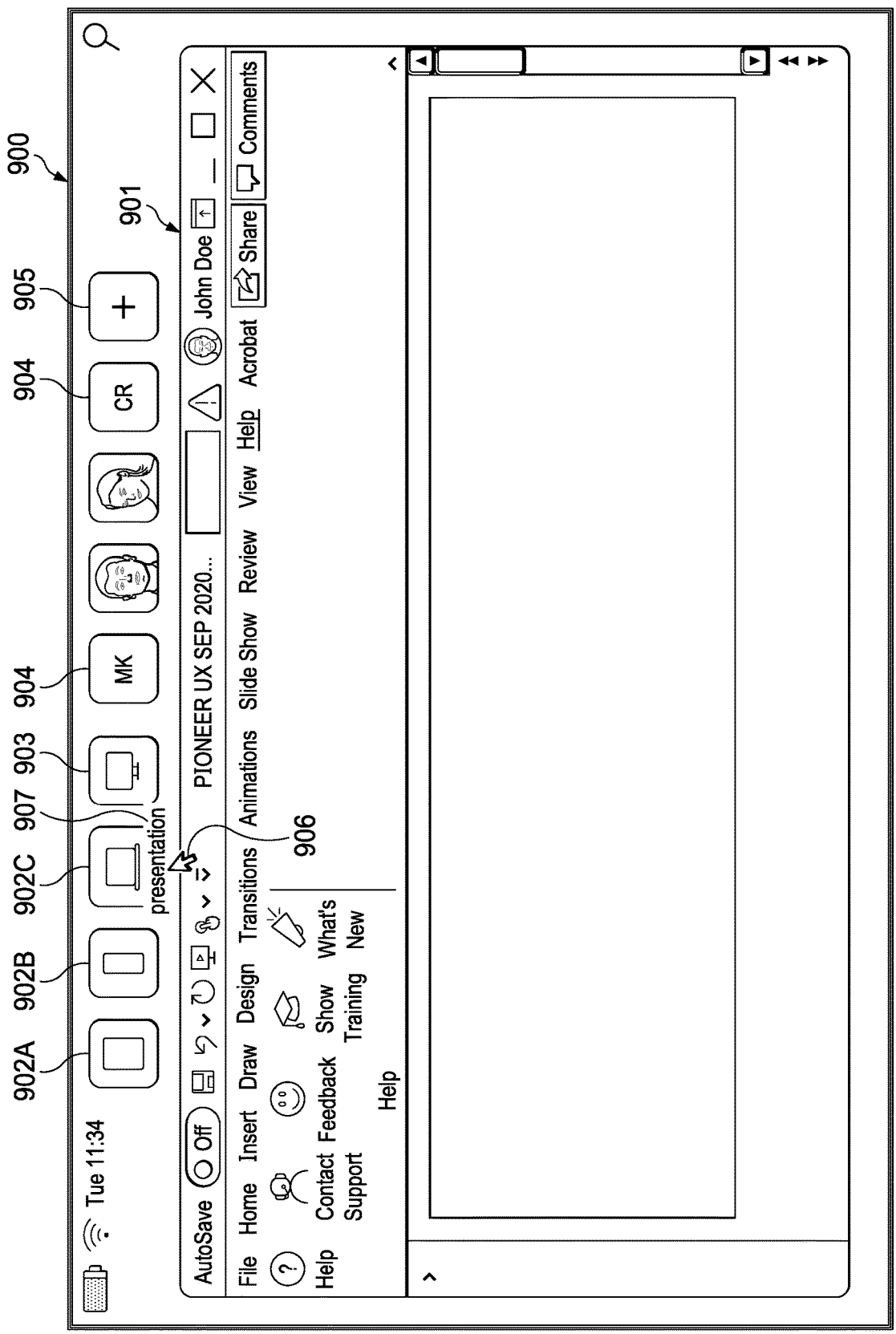
FIGS. 9-11, 12A, and 12B are screenshots illustrating examples of GUI operations enabled by the method of FIG. 8, according to some embodiments.

Screen 900 of FIG. 9 shows an example of such GUI provided by IHS A 802, with graphical representations for three IHSs 902A and 902B at the top of screen 900, as well as a graphical representation of a projection device 903, local and/or remote users 904 participating in the virtual workspace session, and configuration control 905 that enables a user of to manually add or remove devices and/or users to the GUI.

When user 801 manipulates cursor 906 to move application window 901 onto graphical representation 902C, label 907 ("presentation") is displayed to indicate that, in response to user 801 dragging application window 901 to graphical representation 902C, another instance of application window 901 is rendered on another screen of IHS B 802 (not shown), in this case corresponding to GUI representation 902C.

In some implementations, IHS A 802 may maintain application window 901 in screen 900. Alternatively, IHS A 802 may remove application window 901 from screen 900. Moreover, in some implementations, input device(s) controlling cursor 906 in screen 900 may continue to be used to manipulate content displayed in the screen of IHS B 803. Additionally, or alternatively, another input device(s) coupled to IHS B 803 may be used to manipulate the content displayed on the screen of IHS B 803 and/or on screen 900 by user 801 (or another user).

Figure 10:
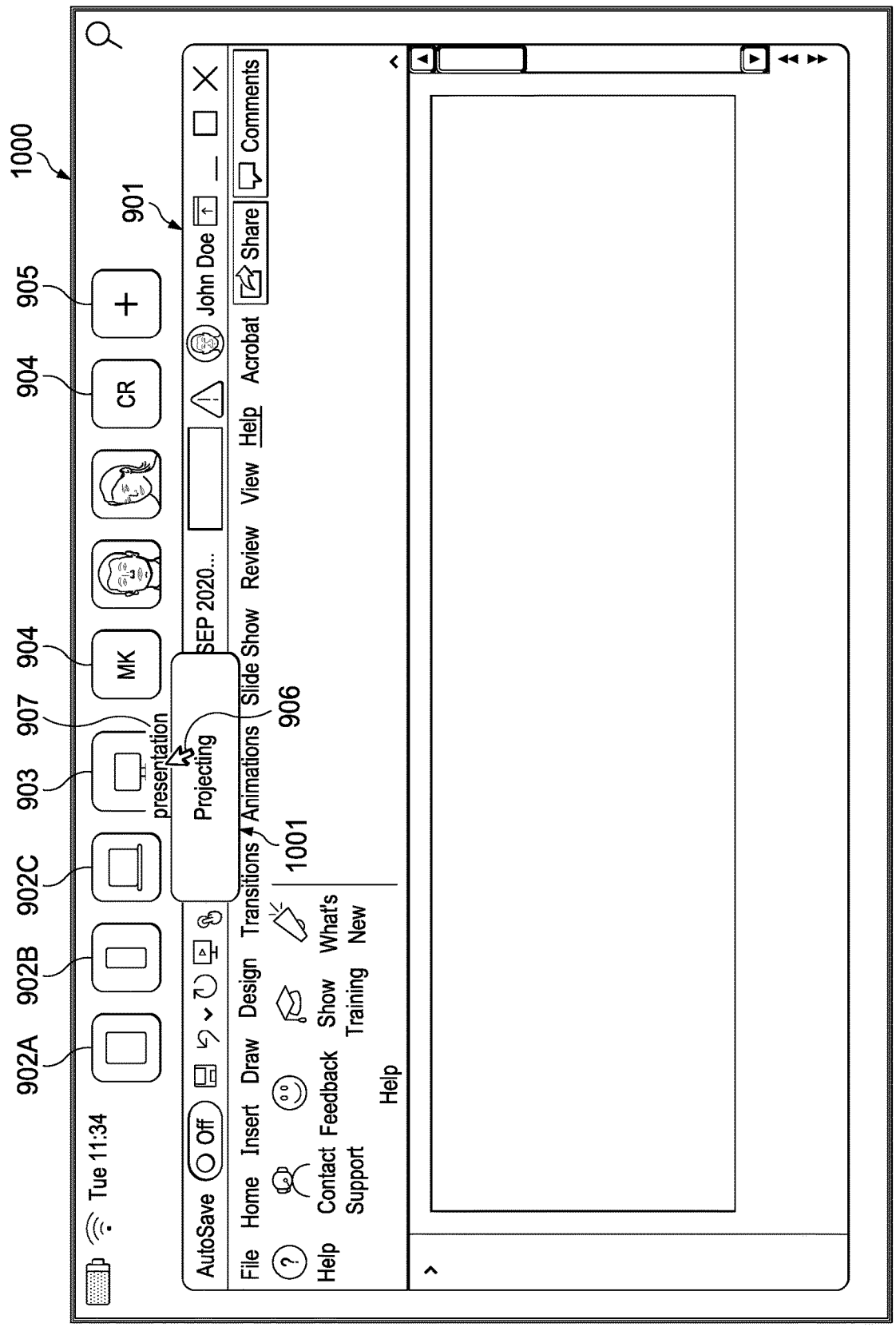
Figure 11:
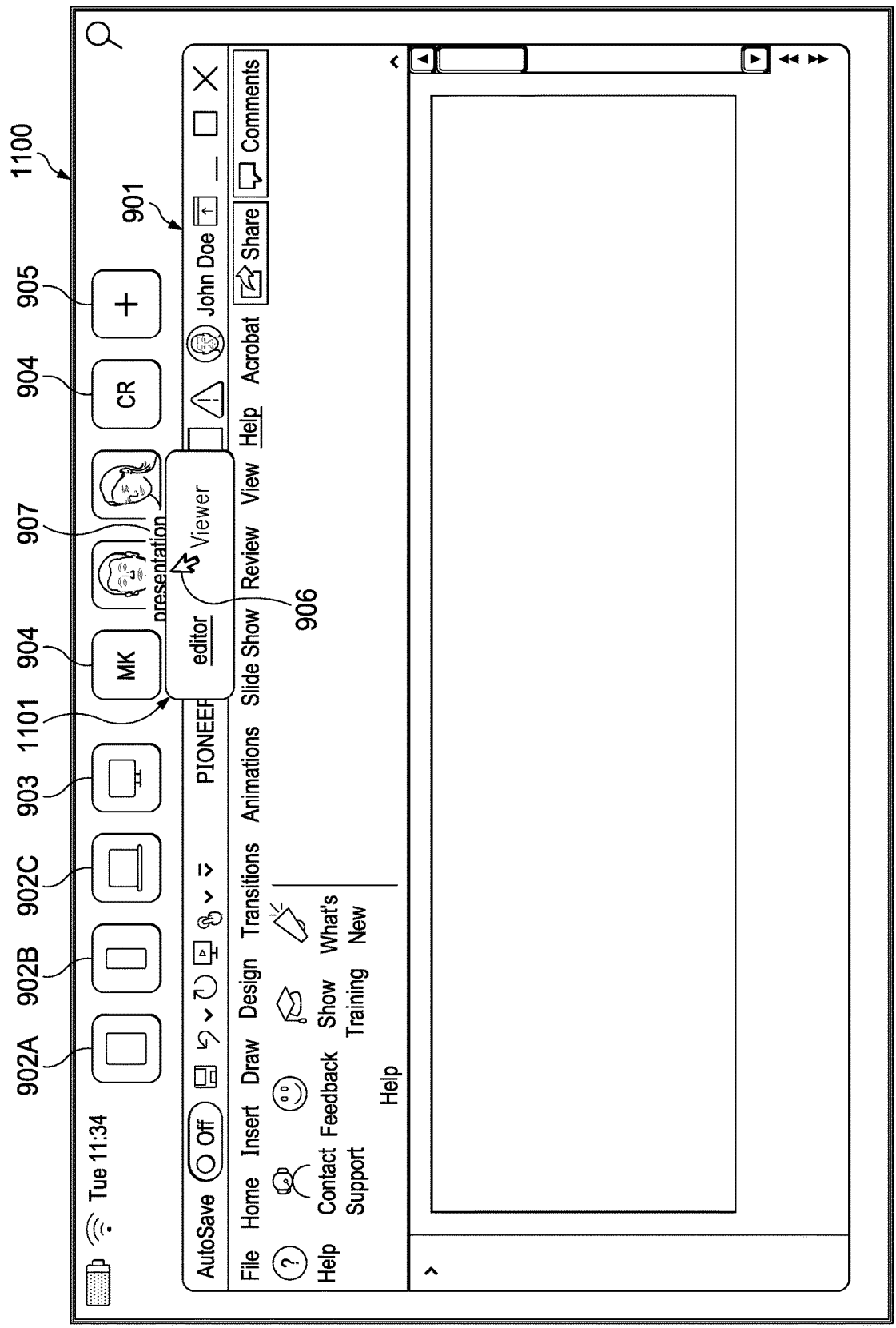

Screen 1000 of FIG. 10 shows similar elements as in screen 900, but this time user 801 drags application window 901 onto graphical representation 903, which is registered with backend server 804 as having projection capabilities. In response to user 801 dragging application window 901 to graphical representation 903, label 1001 indicates that IHS B 803, in this case a projector (e.g., projector 117), is projecting another instance of application window 901 (e.g., on wall 118).

Screen 1100 of FIG. 11 again shows similar elements as in screen 900, but this time user 801 drags application window 901 onto another selected user shown in graphical representations 904 in order to share content with that other user. In response to user 801 dragging application window 901 to graphical representation 904, controls 1101 (which are clickable using pointer 906), enable user 801 to choose whether the other user has viewing-only or editing capabilities with respect to the content displayed in application window 901.

Figure 12A:
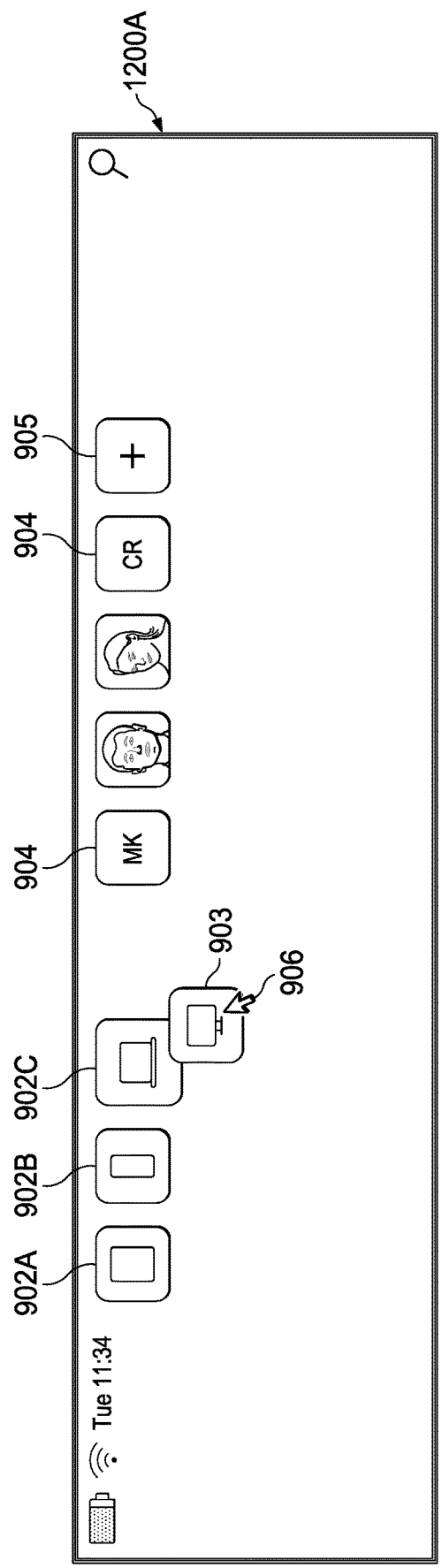

Returning to method 800 of FIG. 8, at some point during the virtual workspace session, user 801 drags the graphical representation corresponding to IHS B 803 onto the graphical representation of IHS A 802. For example, partial screen 1200A of FIG. 12A shows user 801 dragging and dropping graphical representation 903 onto graphical representation 902C.

In response, IHS A 802 sends message 817 to backend server updating the device mesh and creating or modifying the virtual workspace topology to fuse the displays of IHS A 802 and IHS B 803. Then backend server 804 sends message 818 to IHS B 803 to orchestrate IHS B 803 into the virtual workspace session with a topology selected by the user, either manually and/or automatically (e.g., inside-out tracking, camera/image-based, etc.). Backend sever 804 also sends message 819 to IHS A 802 setting the same virtual workspace topology and notifying it that the virtual workspace session has been modified.

Figure 12B:
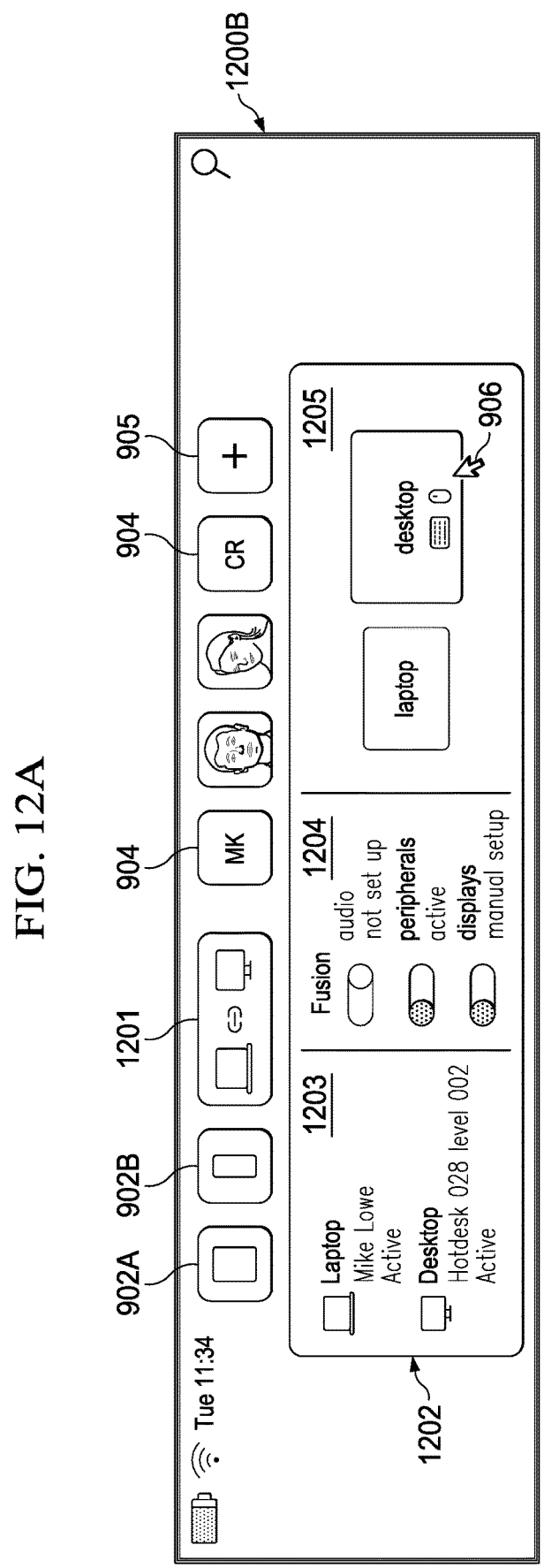

At step 820, user 801 updates the GUI with the new virtual workspace topology, as shown in FIG. 12B. Particularly, graphical representation 1201 shows that IHSs 903 and 902C are fused. Moreover, in response to user 801 dragging the second graphical representation 903 of second IHS 802 onto first graphical representation 904 of first IHS 802, the virtual workspace interface displays one or more fusion controls 1202.

In this example, identification portion 1203 of fusion controls 1202 indicates which IHSs are currently fused in the virtual workspace, in this instance a laptop IHS and a desktop IHS. Moreover, fusion portion 1204 includes an audio fusion element (e.g., a graphical switch) that, upon selection or activation, transmits an audio signal from IHS A 802 to IHS B 803. Fusion portion 1204 also includes a peripheral fusion element that, upon selection or activation, transmits a device input from IHS A 802 to IHS B 803. Fusion portion 1204 further includes a display fusion element that, upon selection or activation, transmits a video output signal from IHS A 802 to IHS B 803.

In addition, fusion controls 1202 include virtual workspace topology representation 1205 that shows the physical relationship the screen of IHS A 802 and of the screen of IHS B 803, and which enables user 801 to manually position the first screen relative to the second screen using drag-and-drop operation via pointer 906 (e.g., left and right, top and bottom).

Back to method 800 of FIG. 8, at step 821 user 801 may interact with the virtual workspace using IHS A 802. IHS A 802 executes user interactions cross the virtual workspace at step 823, and to the extent those interactions involve IHS B 803, IHS A sends an indication of such interactions to IHS B 803 at step 822, so that IHS B 803 can perform corresponding interactions locally at step 824. Both IHS A 802 and IHS B 803 report their state to backend server 804 for synchronization purposes at steps 826 and 825, respectively. Accordingly, backend server 804 maintains the true state of the virtual workspace in the cloud for initiation, configuration, tearing down, and/or other orchestration purposes.

In various embodiments, systems and methods described herein may provide contextual intelligence for virtual workspaces produced across IHSs. For example, a "dive back in" screen or contextual menu may relay the most relevant content to a given user, thus enabling that user to quickly view status on projects, interactions with other people, unread messages, and/or the ability to launch into a new or existing project. The content may be scored based upon its relevance using heuristics or rules applied to contextual data associated with the user, such as: calendar events, communication channels, nearby people, nearby devices, geo-location, device type (personal vs. collaboration vs. presentation), virtual workspace state, user projects, etc.

In some cases, the "dive back in" screen may be expanded on right-side bar on the user's desktop or primary display, and/or it may be presented by any selected IHS participating in the virtual workspace. In some cases, the "dive back in" screen may be rendered as or in addition to a contextual right-side bar that can be opened while the user is interacting with applications in the virtual workspace. For instance, the user may drag content between the virtual workspace and the right context bar.

Whereas the "dive back in" screen may be used for switching tasks, a context bar (another example of a contextual menu) may be reactive to the user's workspace and show content relevant to the user's current state or context. Messages may also be shown in the context bar so the user can send and receive messages without having to find the right app to do messaging tasks. As a user searches for content, the context bar may update its interface to show content that matches the user's data and/or applicable rules. User context may be derived from the client side as well as pushed from the cloud, for example, based upon device/user state, applications running, calendar, location, time of day, historic patterns, etc. In various implementations, the context bar may adhere to any suitable plugin framework that allows different types of cloud-native applications to live, depending upon user preferences and/or as recommended intelligence engines (e.g., artificial intelligence or machine learning engines)

In some cases, the "dive back in" screen may be displayed based upon the proximity of a phone, tablet, wearable IHS, and/or person to initiate the screen and query the scored relevance data to be displayed. The screen may also be displayed manually through a button or when it is scheduled for a user to change tasks.

The "dive back in" screen may include projects on its topmost border with a horizontal scroll bar. Each project may include a snapshot image or icon of an associated application in a tile format filling approximately ⅔'s of the available screen space. People that are associated with a given project may be represented at the bottom right. A project feed and goals and a status bar or graph of time spent may also be displayed. Based on the highest scored relevant project, the "dive back in" screen may re-order the project tiles to match those scores in descending order or relevance, from most relevant to least relevant.

For example, if a user is currently working on project A, and then the user receives a notification to join a meeting related to project B, the user may click on a corresponding tile of the context bar to initiate one or more applications and/or to display content relevant to project B, optionally in the same state as when the user left project B off.

As such, systems and methods described herein may provide for the curation of relevant data to the user, including recent projects, project labeling, inspirational metadata, weather, calendar, events, communication channels (e.g., instant messaging, email, etc.) and general notifications. Curation of this data may be had through user interaction paradigms within the user interface collecting data around searched content, labeled projects and work, along with device usage and collaboration instances.

Figure 13:
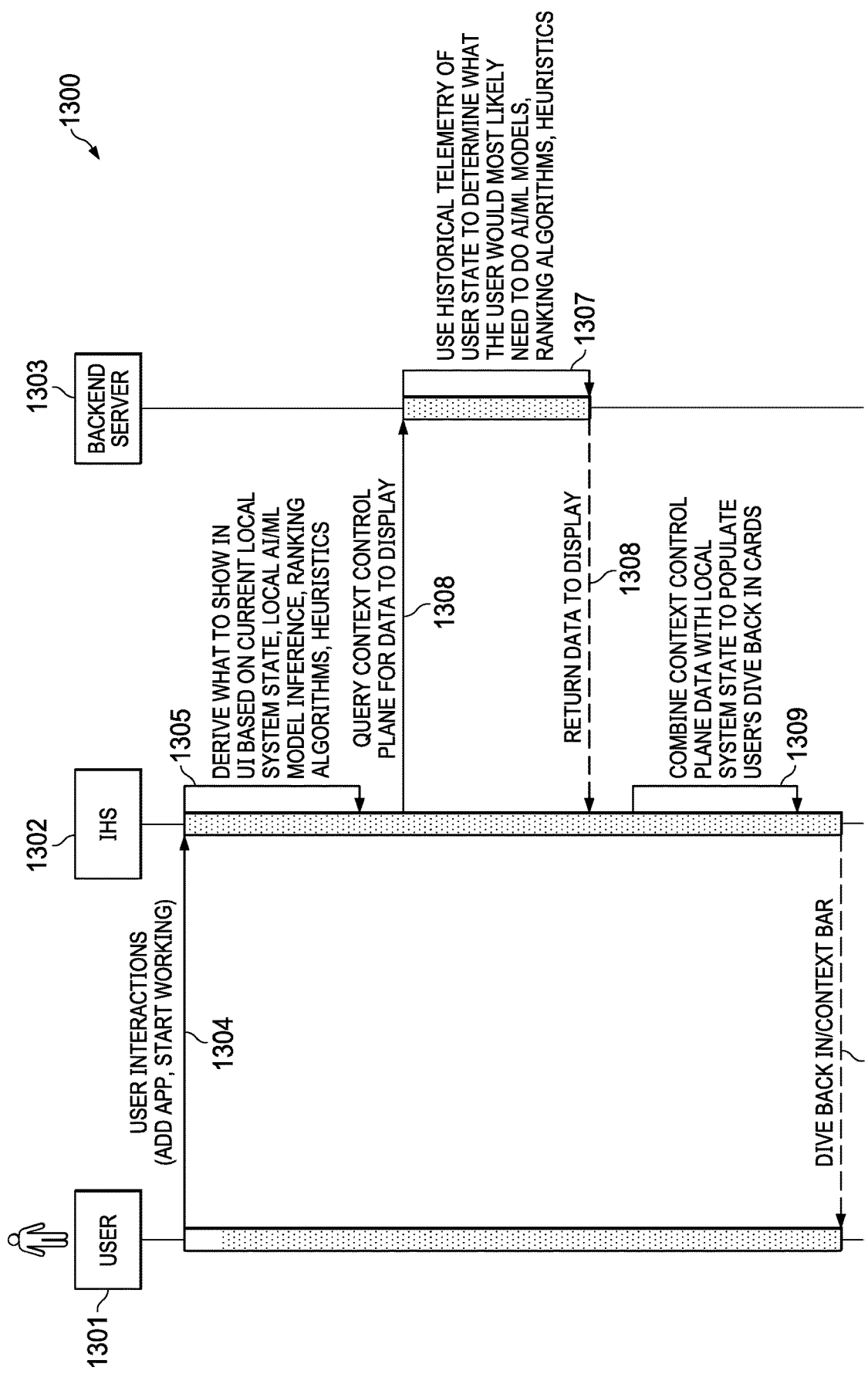
FIG. 13 is a diagram illustrating an example of a method for providing contextual intelligence for virtual workspaces produced across IHSs, according to some embodiments.

FIG. 13 is a diagram illustrating an example of a method for providing contextual intelligence for virtual workspaces produced across IHSs. In various embodiments, method 1300 may be performed through the execution of one or more software components 300 by one or more hardware components 200. Particularly, at step 1304, user 1301 interacts with IHS 1302 to start working, for example, by executing an application, starting a new application window, opening, viewing, or editing content, etc.

At step 1305, IHS 1302 identifies what content to show the user in a virtual workspace interface based upon current system state or context information, for example, using inferences generated by a local AI/ML engine or model, ranking algorithms, and/or heuristics or rules. At step 1306, IHS 1302 queries a context control plane of backend server 1303 for data to display. At step 1307, backend server 1303 uses historical telemetry of user state and context information to determine which data a user may be most likely to need, using a cloud-based AI/ML engine or model, ranking algorithms, and/or heuristics or rules. At step 1307, backend server 1303 returns the data to IHS 1302.

At step 1309, IHS 1302 combines context control plane data received from backend server 1303 with local systems state data to populate tiles in a "dive back in" screen, context bar, or other type of contextual menu as part of a virtual workspace interface. The populated context menu is then presented to user 1301 at step 1310.

In some cases, the context menu may be rendered by another IHS other than IHS 1302. For example, depending upon the relative location of two or more displays part of the virtual workspace topology, the context menu may be rendered by the display of whichever IHS is on the right side (or on the left side, as selected by the user or determined by the AI/ML engine or rules). As another example, if a first one of the IHSs participating in the virtual workspace session has a laptop or desktop form-factor, and a second IHS has a mobile phone or tablet form-factor, the second IHS may be selected to display the contextual menu—i.e., the user, AI/ML engine, or rules may select which IHS to display the contextual menu based upon the IHSs' various form-factors.

In some cases, the display selected to show the context menu may change during the same virtual workspace session. For instance, in the case of two IHSs, each IHS having a distinct display, the selected display may be a first display of the first IHS during a first portion of a virtual workspace session and the given display may be switched to the second display of the second IHS during a second portion of the virtual workspace session following the first portion, for example, in response to drift and/or other change in the topology of the virtual workspace session.

Additionally, or alternatively, the display showing the context menu may be selected, at least in part, depending upon a proximity of the second IHS to the first IHS. For example, if the distance between the first and second IHSs is greater than a selected value, the context menu may be provided to the display of the first IHS. Conversely, if the proximity between the first and second IHSs is less than the selected value, the context menu may be provided to the display of the second IHS.

In various embodiments, the contextual menu—in the form of a "dive back in" screen or context bar—may include a plurality of tiles, each tile having at least one of: (i) an application or (ii) piece of content associated with one of a plurality of projects. Each of the plurality of projects may be positioned on the contextual menu based upon: a location of the first IHS, a location of the second IHS, a form-factor of the first IHS, a form-factor of the second IHS, a calendar event, a communication channel in use, a proximity of another user with respect to the user, and/or a proximity of the second IHS with respect to the first IHS.

In some cases, upon the user's selection of a given one of the plurality of tiles, each application listed in the given tile may be launched with each associated piece of content in a last-used application window configuration. Additionally, or alternatively, upon the user's dragging-and-dropping of a given one of the plurality of tiles to a different location on the contextual menu, the tiles may be repositioned in an order selected by the user.

Additionally, or alternatively, upon the user's dragging-and-dropping of a piece of content from an application window to a selected tile of the contextual menu, the piece of content maybe added to a project associated with the selected tile. Additionally, or alternatively, upon the user's dragging-and-dropping of a piece of content from a selected tile of the contextual menu to an application window, the piece of content may be pasted onto and/or reproduced within the application window.

Figure 14:
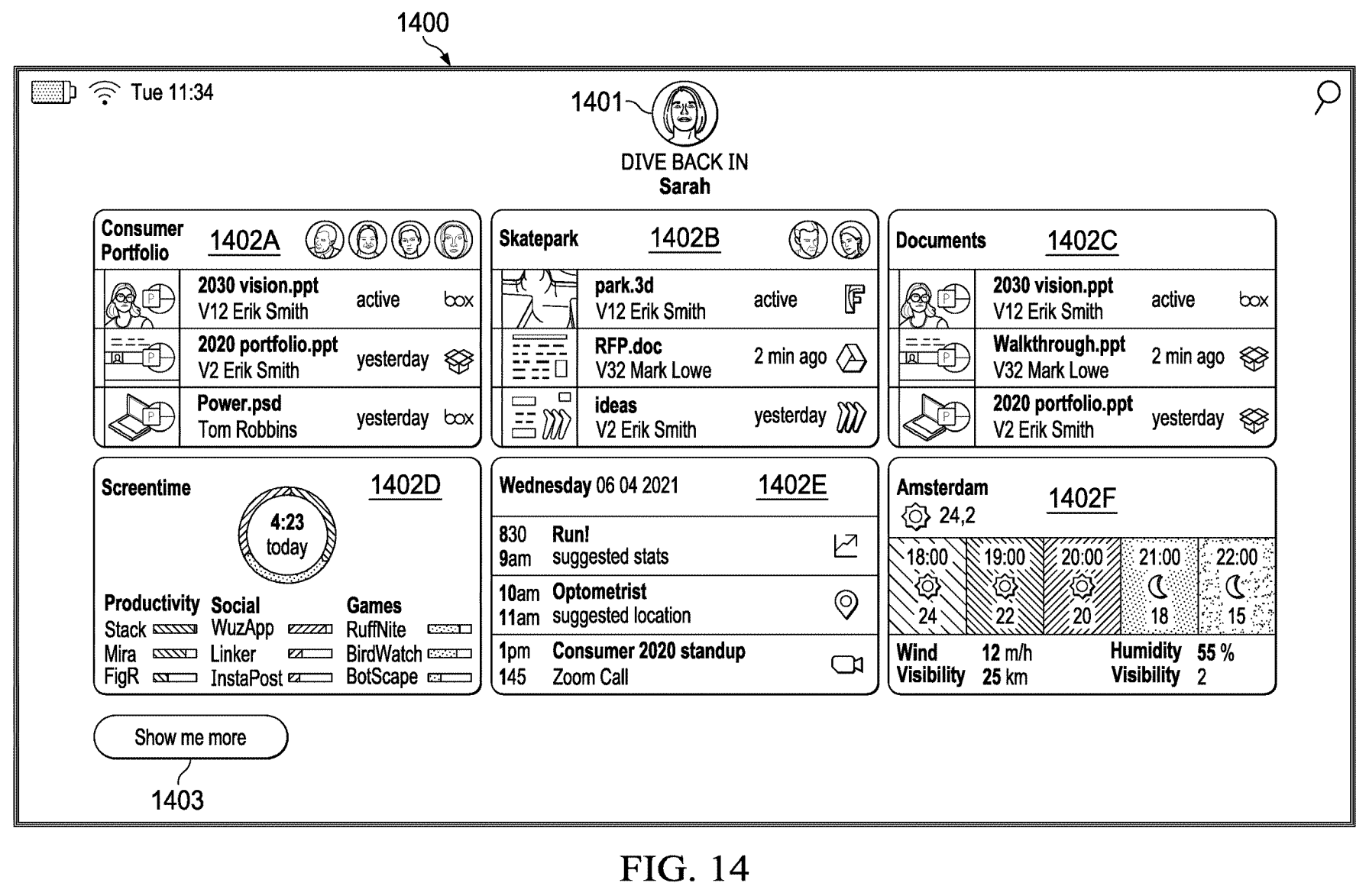

FIGS. 14, 15A, 15B, 16, 17, and 18A-C are screenshots illustrating examples of GUI features and/or operations enabled by the method of FIG. 13. Screenshot 1400 of FIG. 14 shows an example of a "dive back in" screen.

In some implementations, when user 1401 signs into an IHS, the IHS presents the user with such a "dive back in" screen, a contextually relevant overview of activities and content that are relevant to the user in that moment, allowing the user to immediately get to work. In this example, two projects 1402A and 1402B are presented (Consumer Portfolio and Skatepark) in "tiles," each tile having a number of suggested local or cloud-based applications and/or content to be initiated, opened, and/or executed upon the user's clicking on a corresponding tile.

Documents tile 1402C lists the most recent and/or most relevant documents in the user's particular context or moment. Other tiles 1402D-F may include other information selected based upon the user's context, including, but not limited to: weather, media, communications (e.g., email, IM, etc.), photos, calendar, etc. Meanwhile, button or control 1403 allows the user to start a different activity than those shown in tiles 1402A-F.

Figure 15B:
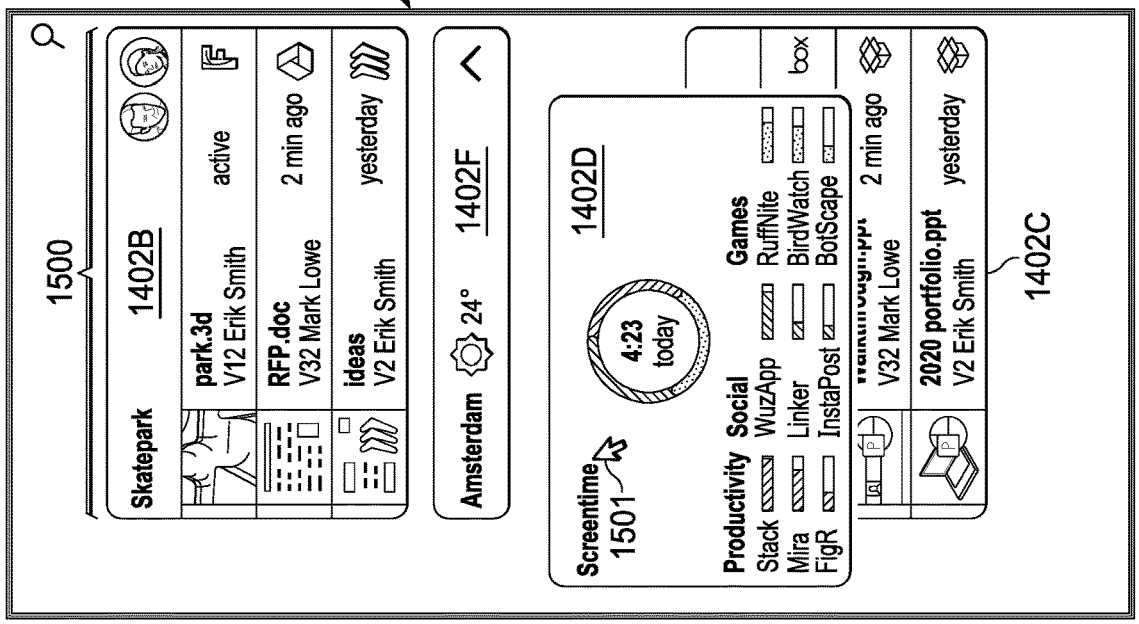
Figure 15A:
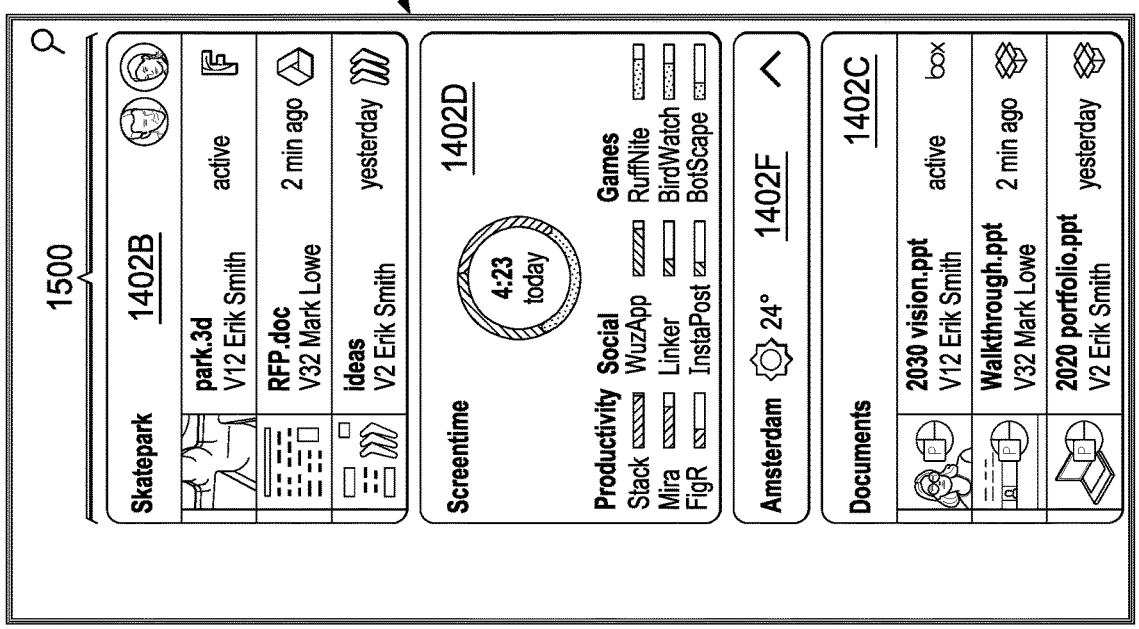

Screenshot 1500A of FIG. 15A illustrates and example of smart or contextual bar 1500 with tiles 1402B-D and 1402F selected to be showed vertically, for example, when the user's pointer 1501 reaches the right edge of the screen, upon a button press or hotkey, by swiping left from the right edge of a display, etc. Particularly, the content of contextual bar 1500 may be the same as that of the "dive in screen" but with tiles that are most relevant to the particular device rendering it, in that moment, based on user activity (open apps), location, calendar, etc.

Screenshot 1500B of FIG. 15B shows that the user can move or remove tiles, such as tile 1402D, by clicking and dropping tiles using pointer 1501. Moreover, the user's behavior may be used as feedback to train an AWL algorithm and to reorder tiles as selected by the user. Examples of contextual metadata that may be used for training or selection purposes may include, but are not limited to: applications, cloud-native data, user session, IP address, location (e.g., home vs. office vs. working offsite), user interaction patterns (e.g., copy/paste/screenshot), time, calendar, etc.

Figure 16:
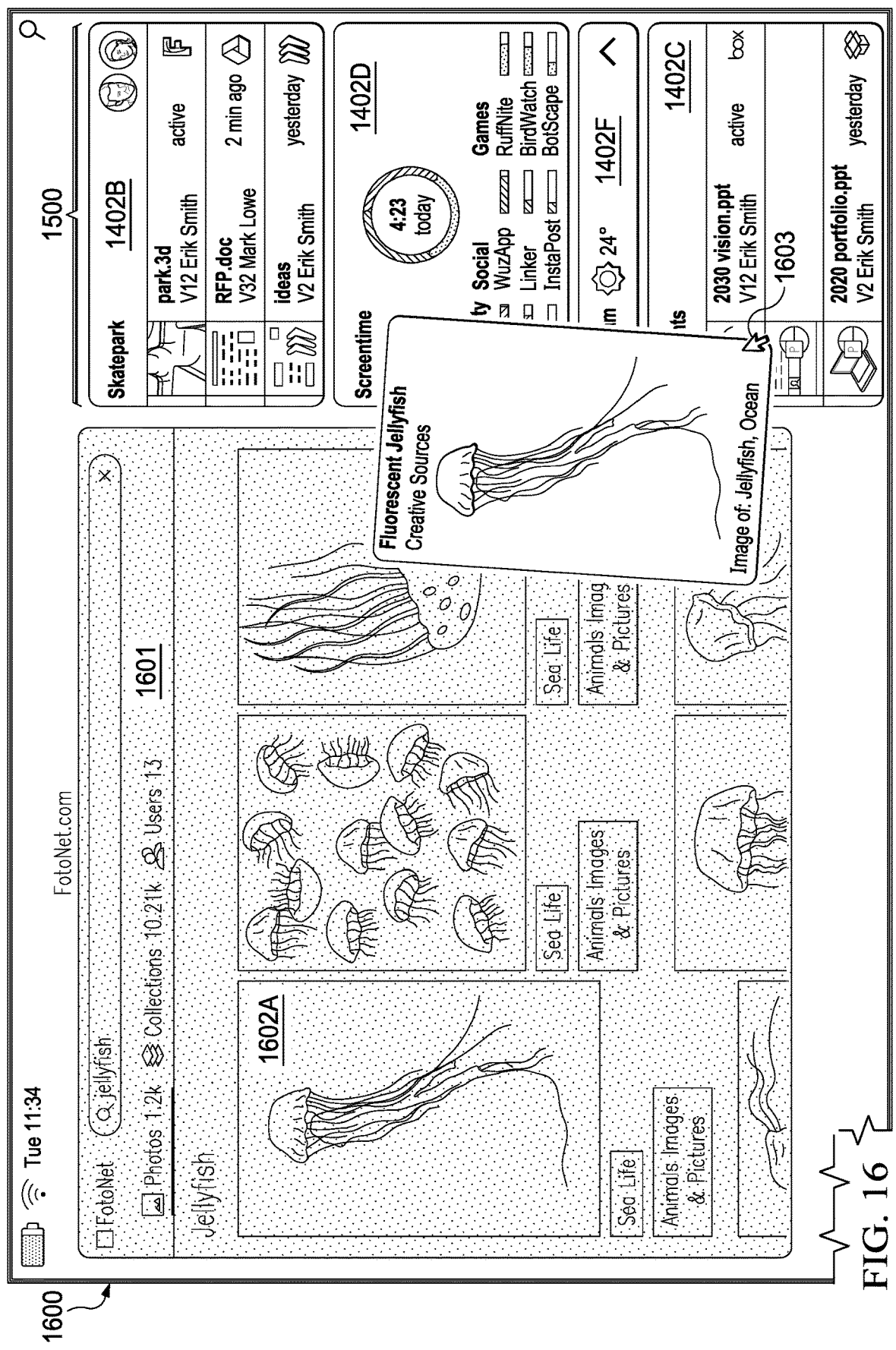

Contextual bar 1500 is a great companion to keep available while working during a virtual workspace session. Specifically, screenshot 1600 of FIG. 16 shows application window 1601 next to contextual bar 1500, and content 1602A being dragged-and-dropped from window 1601, as clip 1602B, to tile(s) 1402B or 1402C using pointer 1603.

Figure 17:
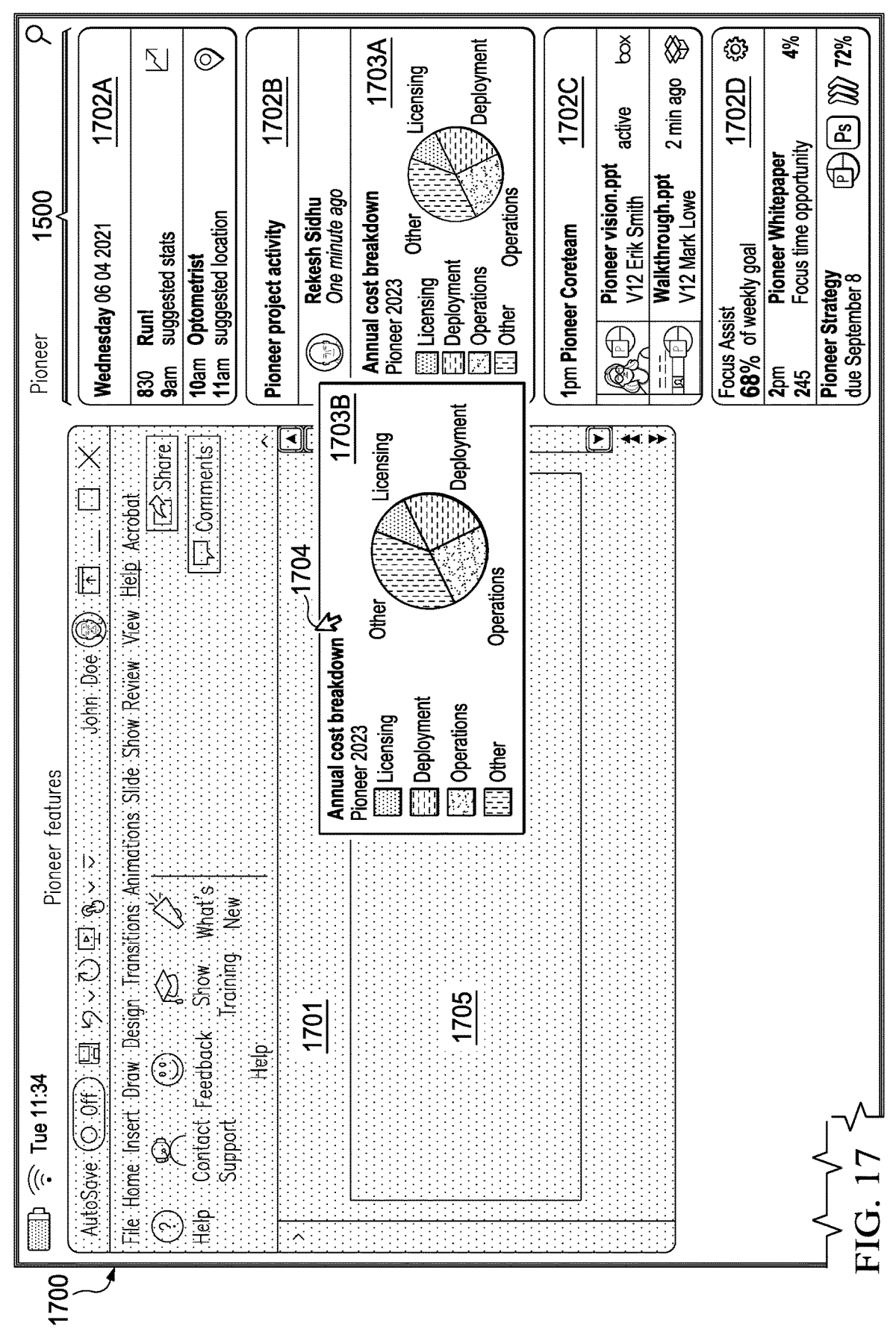

Meanwhile, screenshot 1700 of FIG. 17 shows application window 1701 next to contextual bar 1500, and content 1703A being dragged-and-dropped from tile 1702B, as clip 1703B, to document 1705 of window 1701 using pointer 1704. The activities of FIGS. 16 and 17 may be logged and labeled with a snapshot of context and telemetry from user, device and open applications, usable in connection with the AI/ML engine.

Figure 18B:
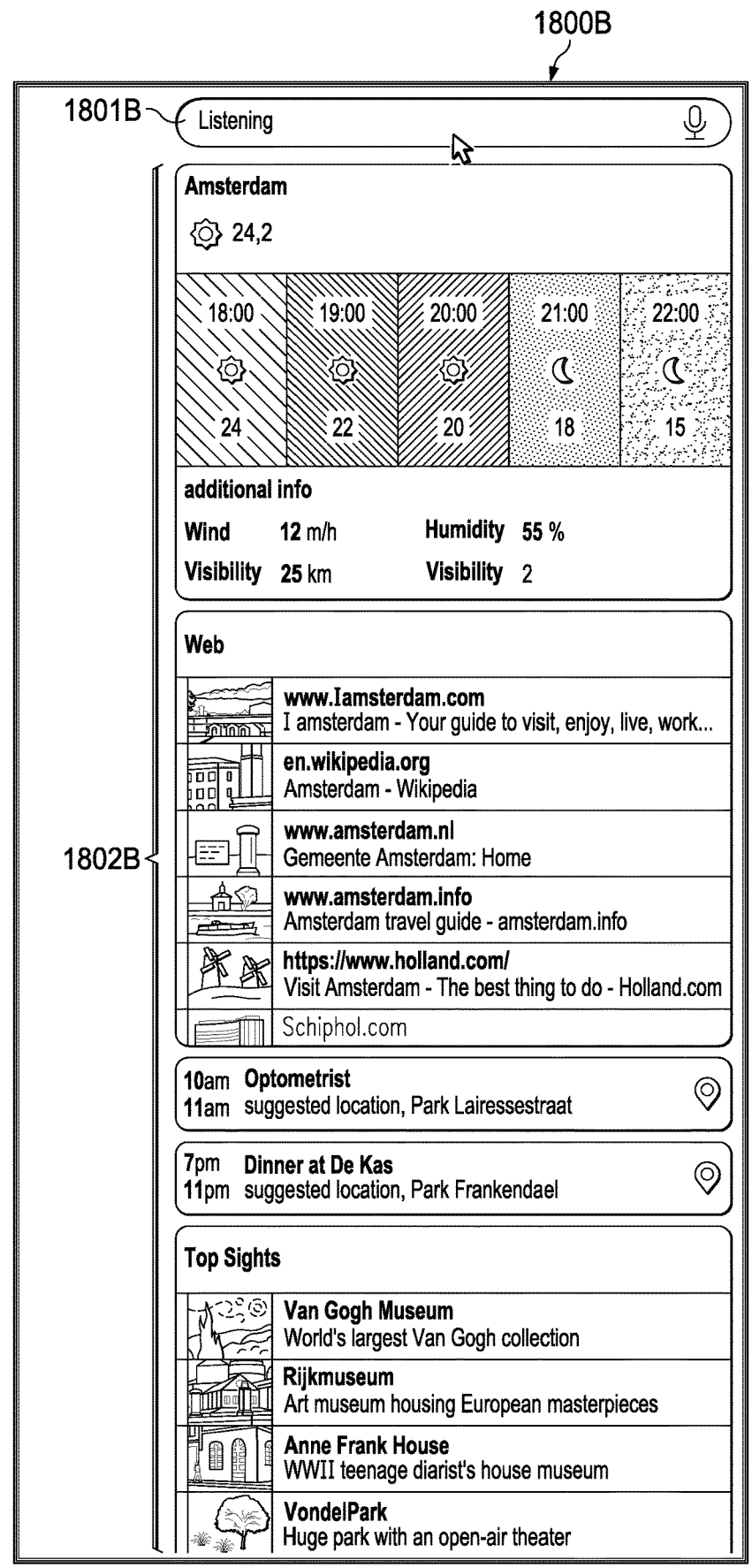
Figure 18C:
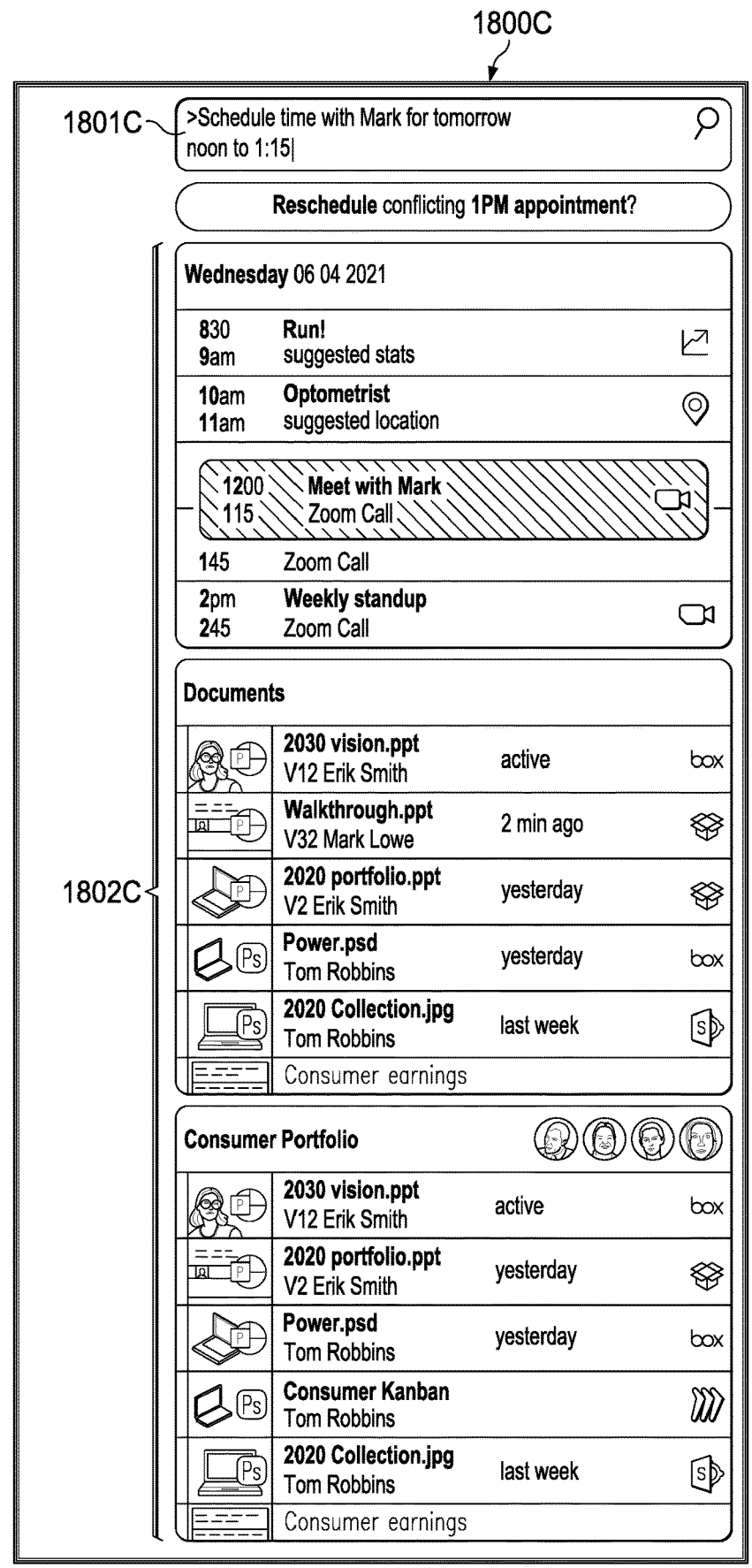

Screenshots 1800A-C of FIGS. 18A-C show that contextual bars 1802A-C may include search boxes or bars 1801A-C, respectively. Any query in search box 1801A may define what tiles and content are shown in the contextual bar, thus providing a quick way to search for relevant documents, communication, web pages, calendar events, etc. for any given subject or project. Additionally, or alternatively, search box 1801B shows the effect of pressing and holding on to search box may activate voice input. Additionally, or alternatively, commands in search box 1801C may entered, for example, by preceding the text input in the search box with a ">" sign (or another configurable character, button press, or hot key). This activates an assistant that then starts a dialog to respond to the command and curates relevant tiles to assist the execution.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A first Information Handling System (IHS), comprising:
a processor; and
a memory coupled to the processor, the memory having program instructions stored thereon that, upon execution, cause the first IHS to:
establish a virtual workspace across a first display of the first IHS and a second display of a second IHS, at least in part, through a backend IHS, wherein the virtual workspace is a single workspace that fuses the first display and the second display into single virtual screen space controlled or manipulated by only one IHS at a time, wherein the virtual workspace is configured to allow the first IHS to move content from the first display to the second display and manipulate the content on the second display; and
provide a contextual menu for rendering by a given one of the first or second displays, wherein the given display is selected, at least in part, based upon a relative position of the first display with respect to the second display and on a form-factor of the first IHS and a form-factor of the second IHS, wherein only one of the first display or the second display is selected, and the contextual menu is only displayed on the given display.

2. The first IHS of claim 1, wherein to establish the virtual workspace, the program instructions, upon execution, further cause the first IHS to:
transmit a virtual workspace initiation request to the backend IHS, wherein the request comprises an identification of the second IHS;
receive, from the backend IHS, data associated with the second IHS;
determine the relative position of the second IHS with respect to the first IHS; and
establish the virtual workspace across the first display of the first IHS and the second display of the second IHS based upon the data and the relative position.

3. The first IHS of claim 1, wherein the given display is the first display in response to the first display having a selected relative position with respect to the second display.

4. The first IHS of claim 3, wherein the given display is the second display in response to the second display having the selected relative position with respect to the first display.

5. The first IHS of claim 3, wherein at least one of: (a) the given display is the first display during a first portion of a virtual workspace session and the given display is the second display during a second portion of the virtual workspace session following the first portion; or (b) the given display is the second display during a first portion of a virtual workspace session and the given display is the first display during a second portion of the virtual workspace session following the first portion.

6. The first IHS of claim 1, wherein the given display is further selected, at least in part, depending upon a proximity of the second IHS to the first IHS.

7. The first IHS of claim 1, wherein to provide the contextual menu, the program instructions, upon execution, further cause the first IHS to present, in each of a plurality of tiles, at least one of: (i) an application or (ii) piece of content associated with one of a plurality of projects.

8. The first IHS of claim 7, wherein each of the plurality of projects is positioned on the contextual menu based upon at least one of: a location of the first IHS, a location of the second IHS, a calendar event, a communication channel in use, a proximity of another user with respect to a user, or a proximity of the second IHS with respect to the first IHS.

9. The first IHS of claim 7, wherein upon a user's selection of a given one of the plurality of tiles, the program instructions, upon execution, further cause the first IHS to launch each application listed in the given tile with each associated piece of content in a last-used application window configuration.

10. The first IHS of claim 7, wherein upon a user's dragging-and-dropping of a given one of the plurality of tiles to a different location on the contextual menu, the program instructions, upon execution, further cause the first IHS to re-position the tiles in an order selected by the user.

11. The first IHS of claim 7, wherein upon a user's dragging-and-dropping of a piece of content from an application window to a selected tile of the contextual menu, the program instructions, upon execution, cause the first IHS to add the piece of content to a project associated with the selected tile.

12. The first IHS of claim 7, wherein upon a user's dragging-and-dropping of a piece of content from a selected tile of the contextual menu to an application window, the program instructions, upon execution, cause the first IHS to paste or reproduce the piece of content onto the application window.

13. The first IHS of claim 1, wherein the contextual menu comprises a search bar.

14. A non-transitory memory storage device having program instructions stored thereon that, upon execution by a processor of a first Information Handling System (IHS), cause the first IHS to:
establish a virtual workspace across a first display of the first IHS and a second display of a second IHS, at least in part, through a backend IHS; and
provide a contextual menu for rendering by a given one of the first or second displays, wherein the given display is selected, at least in part, based upon a relative position of the first display with respect to the second display and on a form-factor of the first IHS and a form-factor of the second IHS, wherein the contextual menu comprises a plurality of tiles, and wherein at least one of the plurality of tiles is associated with a single one of a plurality of projects and comprises: a local or cloud-based application associated with the project, an electronic file associated with the project, and at least one person assigned to the project, wherein only one of the first display or the second display is selected, and the contextual menu is only displayed on the given display.

15. The memory storage device of claim 14, wherein each of the plurality of tiles is positioned on the contextual menu based upon at least one of:

a location of the first IHS, a location of the second IHS, a calendar event, a communication channel in use, a proximity of another user with respect to a user, or a proximity of the second IHS with respect to the first IHS.

16. The memory storage device of claim 14, wherein upon a user's selection of a given one of the plurality of tiles, the program instructions, upon execution, further cause the first IHS to launch each application listed in the given tile with each associated piece of content in a last-used application window configuration.

17. The memory storage device of claim 14, wherein upon a user's dragging-and-dropping of a piece of content from an application window to a selected tile of the contextual menu, the program instructions, upon execution, cause the first IHS to add the piece of content to a project associated with the selected tile.

18. The memory storage device of claim 14, wherein upon a user's dragging-and-dropping of a piece of content from a selected tile of the contextual menu to an application window, the program instructions, upon execution, cause the first IHS to paste or reproduce the piece of content onto the application window.

19. A method, comprising:
transmitting, by a first Information Handling System (IHS), a virtual workspace initiation request to a backend IHS, wherein the request comprises an identification of a second IHS;
receiving, at the first IHS from the backend IHS, workspace configuration data associated with hardware components of the second IHS;
determining, by the first IHS, a relative position of the second IHS with respect to the first IHS;
establishing, by the first IHS, the virtual workspace across a first display of the first IHS and a second display of the second IHS based upon the workspace configuration data and the relative position, wherein the first display and the second display render the entire virtual workspace; and
providing, by the first IHS, a contextual menu for rendering by a given one of the first or second displays, wherein the given display is selected, at least in part, based upon a relative position of the first display with respect to the second display and on a form-factor of the first IHS and a form-factor of the second IHS, wherein only one of the first display or the second display is selected, and the contextual menu is only displayed on the given display.

* * * * *